(12) United States Patent
Bonderson et al.

(10) Patent No.: US 11,474,867 B2
(45) Date of Patent: Oct. 18, 2022

(54) MEASUREMENT SEQUENCE DETERMINATION FOR QUANTUM COMPUTING DEVICE

(71) Applicant: Microsoft Technology Licensing, LLC, Redmond, WA (US)

(72) Inventors: Parsa Hassan Bonderson, Santa Barbara, CA (US); Roman Bela Bauer, Santa Barbara, CA (US); Alexei V. Bocharov, Redmond, WA (US); Alan D Tran, Goleta, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 623 days.

(21) Appl. No.: 16/509,427

(22) Filed: Jul. 11, 2019

(65) Prior Publication Data
US 2021/0011771 A1    Jan. 14, 2021

(51) Int. Cl.
*G06F 9/50* (2006.01)
*G06N 10/00* (2022.01)

(52) U.S. Cl.
CPC ........... *G06F 9/5027* (2013.01); *G06N 10/00* (2019.01)

(58) Field of Classification Search
None
See application file for complete search history.

(56) References Cited

U.S. PATENT DOCUMENTS

| | | | | |
|---|---|---|---|---|
| 8,659,007 B2* | 2/2014 | Bonderson | ............. | B82Y 10/00 257/31 |
| 9,152,924 B2* | 10/2015 | Bonderson | ............. | G06N 10/00 |
| 9,501,321 B1* | 11/2016 | Sharifi Mehr | ........ | G06F 9/4881 |
| 9,514,415 B2* | 12/2016 | Bocharov | .............. | B82Y 10/00 |
| 10,360,088 B2* | 7/2019 | Wallman | ............... | G06F 11/004 |
| 10,509,683 B2* | 12/2019 | Furman | .................. | G06F 9/5061 |
| 11,106,992 B2* | 8/2021 | Kelly | .................. | G06F 11/0751 |
| 11,121,725 B2* | 9/2021 | Murali | .................. | H03M 13/29 |
| 11,194,642 B2* | 12/2021 | Javadiabhari | .......... | G06N 10/00 |
| 11,281,524 B1* | 3/2022 | Egger | .................... | G06N 10/00 |

(Continued)

OTHER PUBLICATIONS

Karzig et al.; Karzig_2017.pdf; pp. 1-32; "Scalable design for quasiparticle-poisoninig-protected topological quantum computation with Majorana zero modes"; American Physical Society, Published Jun. 21, 2017 (Year: 2017).*

(Continued)

*Primary Examiner* — Hiren P Patel
(74) *Attorney, Agent, or Firm* — Alleman Hall Creasman & Tuttle LLP

(57) ABSTRACT

A computing system is provided, including a processor configured to identify a plurality of measurement sequences that implement a logic gate. Each measurement sequence may include a plurality of measurements of a quantum state of a topological quantum computing device. The processor may be further configured to determine a respective estimated total resource cost of each measurement sequence of the plurality of measurement sequences. The processor may be further configured to determine a first measurement sequence that has a lowest estimated total resource cost of the plurality of measurement sequences. The topological quantum computing device may be configured to implement the logic gate by applying the first measurement sequence to the quantum state.

18 Claims, 30 Drawing Sheets

(56) References Cited

U.S. PATENT DOCUMENTS

| | | | | |
|---|---|---|---|---|
| 2011/0161638 | A1* | 6/2011 | Freedman | B82Y 10/00 |
| | | | | 712/E9.017 |
| 2012/0198466 | A1* | 8/2012 | Cherkasova | G06F 9/5066 |
| | | | | 718/104 |
| 2017/0017686 | A1* | 1/2017 | Feng | G06F 16/24545 |
| 2018/0053809 | A1* | 2/2018 | Freedman | G06N 10/00 |
| 2018/0343170 | A1* | 11/2018 | Sridhar | H04L 41/22 |
| 2020/0005186 | A1* | 1/2020 | Romero | G06N 20/00 |
| 2020/0057957 | A1* | 2/2020 | Johnson | G06N 5/003 |
| 2020/0134502 | A1* | 4/2020 | Anschuetz | G06N 3/0635 |
| 2020/0285986 | A1* | 9/2020 | Javadiabhari | G06F 11/0754 |
| 2020/0327441 | A1* | 10/2020 | Cao | G06N 10/00 |
| 2021/0255856 | A1* | 8/2021 | Cao | G06N 10/00 |
| 2021/0365824 | A1* | 11/2021 | Maslov | G06N 10/00 |
| 2022/0156630 | A1* | 5/2022 | Schuster | G06N 10/00 |

OTHER PUBLICATIONS

Litinski et al.; Litinski_2018.pdf; pp. 1-16; "Lattice Surgery with a Twist: Simplifying Clifford Gates of Surface Codes"; arXiv: 1709.02318v2 [qaunt-ph], Published Apr. 17, 2018 (Year: 2018).*

Campbell et al.; Campbell_2017.pdf; pp. 1-22; "Unified framework for magic state distillation and multiqubit gate synthesis with reduced resource cost"; American Physical Society, published Feb. 9, 2017 (Year: 2017).*

Austin G. Fowler; "Polyestimate: instantaneous open source surface code analysis"; The University of Melbourne, Jul. 19, 2013; ( Fowler_2013.pdf; pp. 1-5) (Year: 2013).*

Kinght et al.; "Implementations of Quantum Logic: Fundamental and Experimental Limits"; Imperial College, London, UK, Jul. 19, 2018; (Knight_1997.pdf; pp. 1-16) (Year: 1997).*

Chris Papachristou; "Quantum Computing: Architectures, Circuits, Algorithms"; Case Western Reserve University; IEEE 2019; ( Papachristou_2019.pdf; pp. 507-512) (Year: 2019).*

Suchara et al.; "QuRE: The Quantum Resource Estimator Toolbox"; IEEE 2013; (Suchara_2013.pdf; pp. 419-426) (Year: 2013).*

Bravyi, et al.,"Universal quantum computation with ideal clifford gates and noisy ancillas", Published In Journal Physical review A 71, 022316, Feb. 22, 2005, 15 Pages.

Aasen, et al., "Milestones toward Majorana-based quantum computing",Published In Journal Physical review. X 6, 031016, Aug. 3, 2016, 27 Pages.

Bocharov, et al., "A Depth-Optimal Canonical Form for Single-qubit Quantum Circuits", Retrieved From: http://arxiv.org/pdf/1206.3223pdf, Jun. 14, 2012, 10 Pages.

Bonderson, et al., "Measurement-Only Topological Quantum Computation", Published In Journal Physical review letters 101, 010501, Jun. 30, 2008, 4 Pages.

Bonderson, et al., "Measurement-Only Topological Quantum Computation via Anyonic Interferometry", Published In Journal Annals of Physics, vol. 324, Issue 4, Apr. 2009, 57 Pages.

Fowler, et al., "Surface codes: Towards practical large-scale quantum computation", In Journal Of Physical Review A, vol. 86, Issue 3, Sep. 18, 2012, 54 Pages.

Gottesman, Daniel, "The heisenberg representation of quantum computers", In Proceedings of the XXII International Colloquium on Group Theoretical Methods in Physics, 20 pages.

Hyart, et al., "Flux-controlled quantum computation with Majorana fermions", In Journal Phys. Rev. B 88, 035121, Jul. 17, 2013, 20 pages.

Karzig, et al., "Scalable designs for quasiparticle-poisoning-protected topological quantum computation with Majorana zero modes", In Journal of Physical Review B, vol. 95, Issue 23, Jun. 21, 2017, 32 Pages.

Kitaev, Alexei Yu., "Unpaired majorana fermions in quantum wires", In Journal of Physics-Uspekhi, vol. 44, Issue 131, Oct. 2001, 7 Pages.

Landau, et al., "Towards Realistic Implementations of a Majorana Surface Code", In the Journal Physical Review Letters, vol. 116, No. 5, Feb. 5, 2016, 6 Pages.

Lutchyn, et al., "Majorana zero modes in superconductor-semiconductor heterostructures", In Nature Reviews Materials, vol. 3, Matter 5, May 1, 2018, 17 Pages.

Motrunich, et al., "Griffiths effects and quantum critical points in dirty superconductors without spin-rotation invariance: One-dimensional examples", Published In Phys. Rev. B 63, 224204,May 22, 2001, 14 Pages.

Nayak, et al., "Non-Abelian Anyons and Topological Quantum Computation", In Reviews of Modern Physics, vol. 80, 1083, Sep. 12, 2008, 73 Pages.

Read, et al., "Paired states of fermions in two dimensions with breaking of parity and time-reversal symmetries and the fractional quantum hall effect", Published In Phys. Rev. B 61, 10267, Apr. 15, 2000, 35 Pages.

Reiher, et al., "Elucidating reaction mechanisms on quantum computers", In Proceedings of the National Academy of Sciences, vol. 114, Issue 29, Jul. 18, 2017, pp. 7555-7560.

Selinger, et al., "Efficient Clifford+T approximation of single-qubit operators", Retrieved From: http://arxiv.org/pdf/1311.1074vl.pdf, Jul. 29, 2014, 17 Pages.

Abdelkhalek, et al., "Fundamental Energy Cost for Quantum Measurement", In Journal of Cornell University Library, Sep. 22, 2016, 21 Pages.

Litinski, et al., "Lattice Surgery with a Twist: Simplifying Clifford Gates of Surface Codes", In Journal of Quantum, vol. 2, Issue 62, Apr. 17, 2018, 16 Pages.

"International Search Report and Written Opinion Issued in PCT Application No. PCT/US2020/036578", dated Sep. 18, 2020, 26 Pages.

* cited by examiner

FIG. 6

$|+,+,+\rangle,$ $|-,+,-\rangle = i\gamma_2\gamma_5 |+,+,+\rangle$ $|+,-,-\rangle = i\gamma_4\gamma_5 |+,+,+\rangle$ $|-,-,+\rangle = i\gamma_2\gamma_3 |+,+,+\rangle$

210

$i\gamma_1\gamma_2 = \mathbb{1} \otimes Z, \quad i\gamma_1\gamma_3 = X \otimes Y,$
$i\gamma_1\gamma_6 = \mathbb{1} \otimes X, \quad i\gamma_2\gamma_3 = X \otimes X,$
$i\gamma_2\gamma_6 = -\mathbb{1} \otimes Y, \quad i\gamma_3\gamma_4 = Z \otimes \mathbb{1},$
$i\gamma_4\gamma_5 = X \otimes \mathbb{1}, \quad i\gamma_4\gamma_6 = -Y \otimes Z,$ $i\gamma_1\gamma_4 = -Y \otimes Y, \quad i\gamma_1\gamma_5 = Z \otimes Y,$
$i\gamma_2\gamma_4 = -Y \otimes X, \quad i\gamma_2\gamma_5 = Z \otimes X,$
$i\gamma_3\gamma_5 = Y \otimes \mathbb{1}, \quad i\gamma_3\gamma_6 = X \otimes Z$
$i\gamma_5\gamma_6 = Z \otimes Z,$

212

$X = \begin{bmatrix} 0 & 1 \\ 1 & 0 \end{bmatrix}, \quad Y = \begin{bmatrix} 0 & -i \\ i & 0 \end{bmatrix},$ $Z = \begin{bmatrix} 1 & 0 \\ 0 & -1 \end{bmatrix}$

214

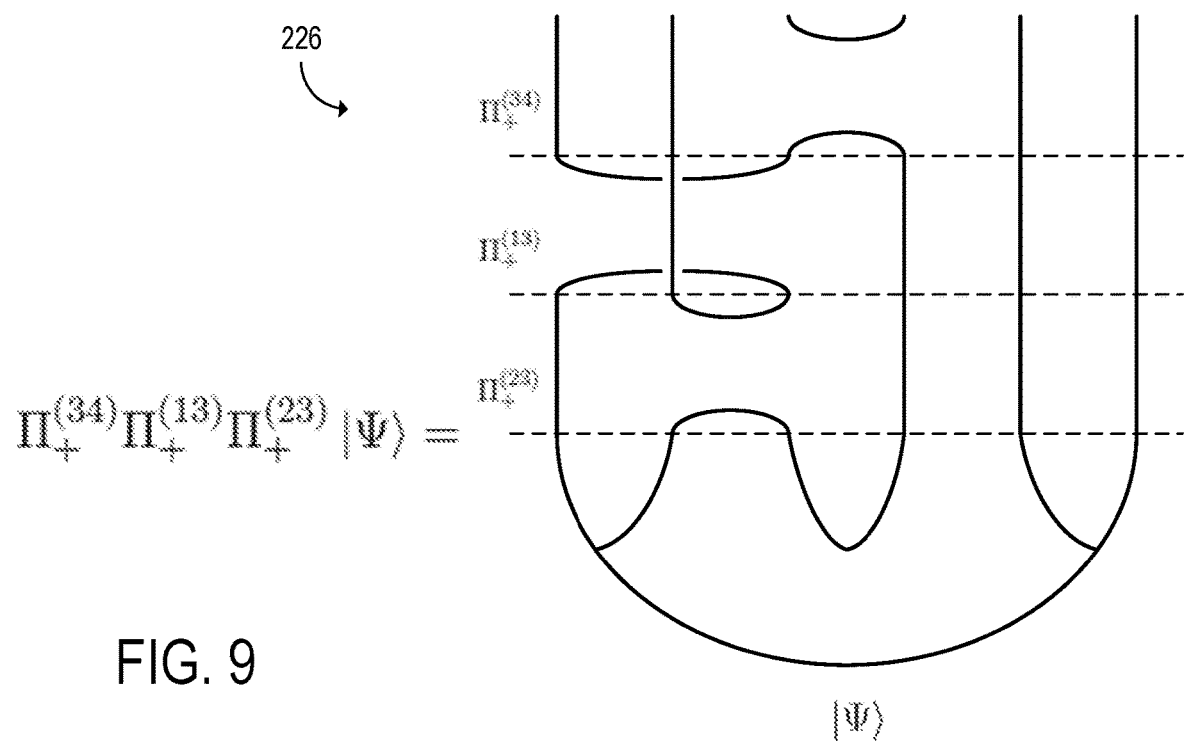
FIG. 9
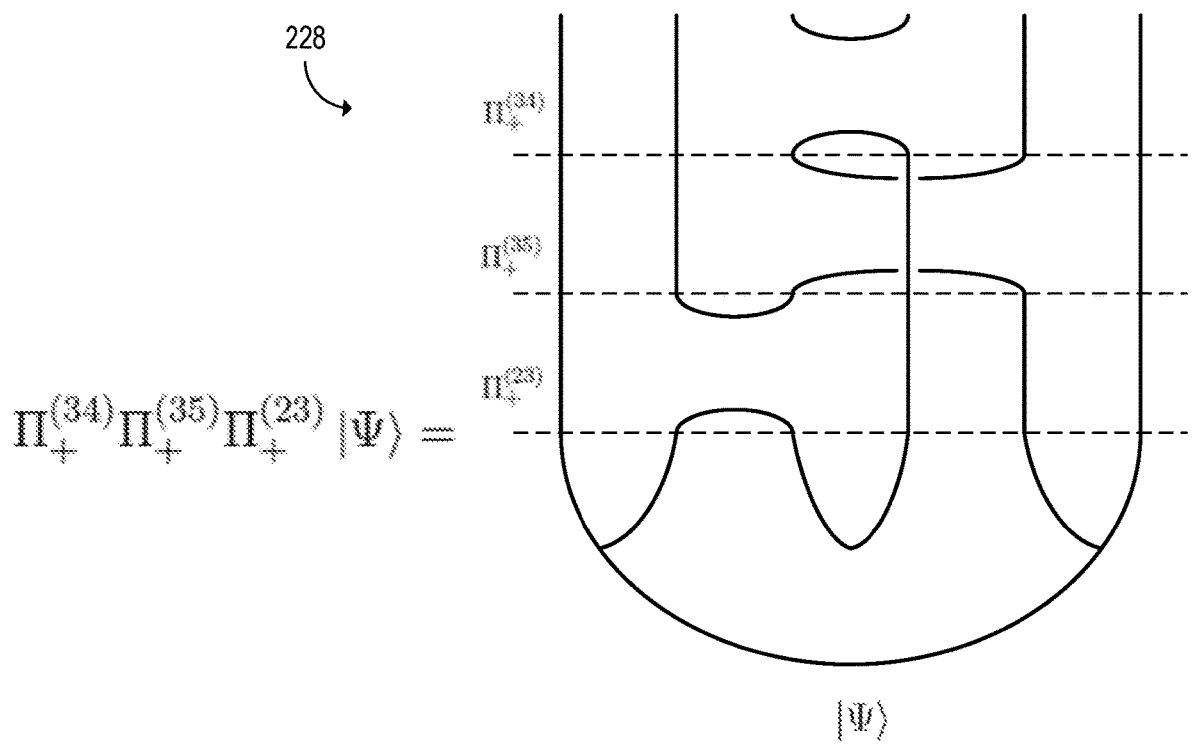

FIG. 13

$$W = \begin{bmatrix} 1 & 0 & 0 & 0 \\ 0 & i & 0 & 0 \\ 0 & 0 & i & 0 \\ 0 & 0 & 0 & 1 \end{bmatrix}$$

$$\Pi_+^{(34)}\Pi_{s_3}^{(35)}\Pi^{(5\bar{6};1'2')}\Pi_{s_1}^{(45)}\Pi_+^{(34)} = \Pi_+^{(34)}\Pi_+^{(\text{anc})} \propto \Pi_+^{(\text{anc})} \otimes W^{-s_1 s_2 s_3}$$

$$= 2^{-3}\Pi_+^{(34)}\left(\mathbb{1} + is_1\gamma_4\gamma_5 + is_3\gamma_3\gamma_5 \; \frac{\mathbb{1} + is_3\gamma_3\gamma_5}{2} \; \frac{\mathbb{1} - s_2\gamma_5\gamma_6\gamma_1'\gamma_2'}{2} \; \mathbb{1} + is_1\gamma_4\gamma_5 \; \Pi_+^{(34)} \right.$$
$$\left. + is_1s_2\gamma_4\gamma_5\gamma_6\gamma_1'\gamma_2' - is_2s_3\gamma_3\gamma_5\gamma_6\gamma_1'\gamma_2' + s_1s_3\gamma_3\gamma_4 \right.$$
$$\left. + is_1s_2s_3\gamma_3\gamma_4\gamma_5\gamma_6\gamma_1'\gamma_2'\right)\Pi_+^{(34)}$$

$$= 2^{-3}\Pi_+^{(34)}\left(\mathbb{1} - is_1s_3\mathbb{1}\; \frac{\mathbb{1} - s_2\gamma_5\gamma_6\gamma_1'\gamma_2'}{2}\; (\mathbb{1} - is_1s_2s_3\gamma_5\gamma_6\gamma_1'\gamma_2')\Pi_+^{(34)}\right)$$

$$= 2^{-5/2}\Pi_+^{(34)}e^{-i\frac{\pi}{4}s_1s_3}\left(\mathbb{1} - is_1s_2s_3\gamma_5\gamma_6\gamma_1'\gamma_2'\right)\Pi_+^{(34)}$$

$$= 2^{-2}e^{i\frac{\pi}{4}s_1s_3(s_2-1)}\Pi_+^{(34)} \otimes W^{-s_1 s_2 s_3}.$$

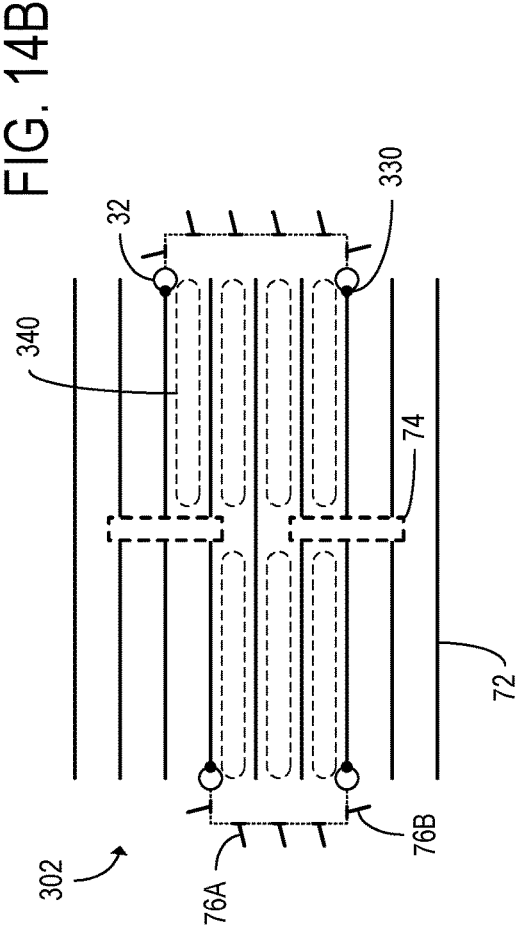
FIG. 14A
FIG. 14B
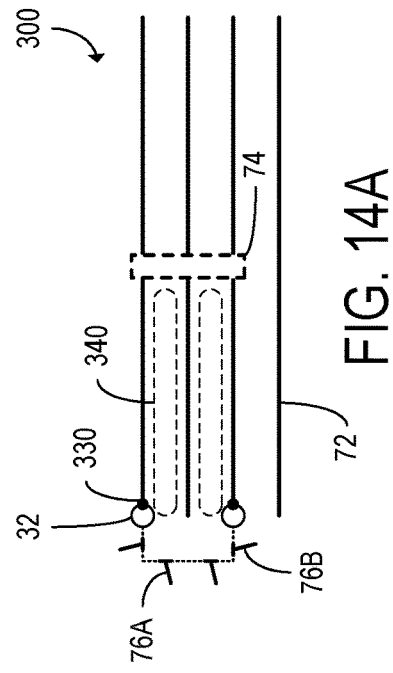
FIG. 14C
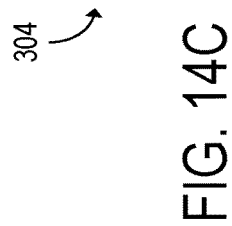
FIG. 14D

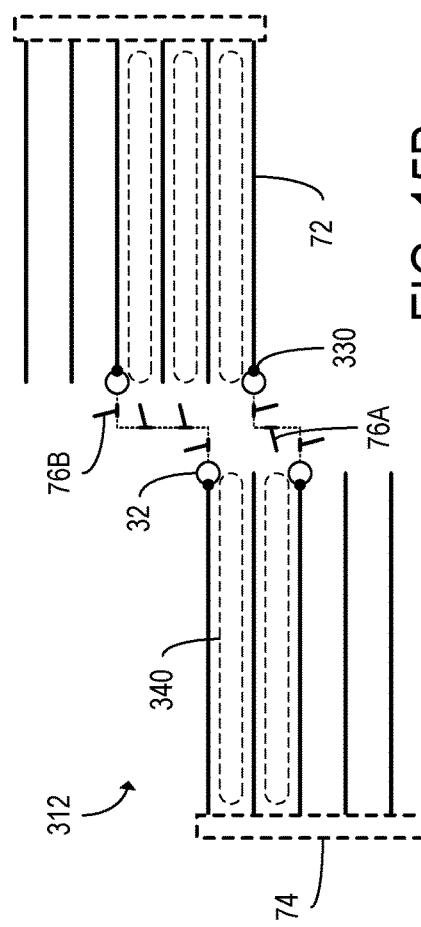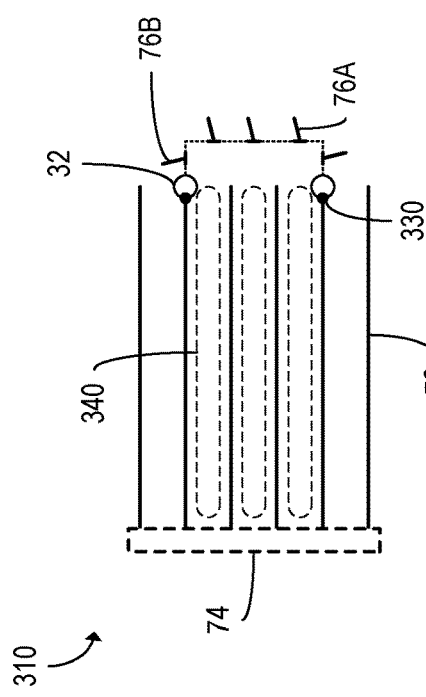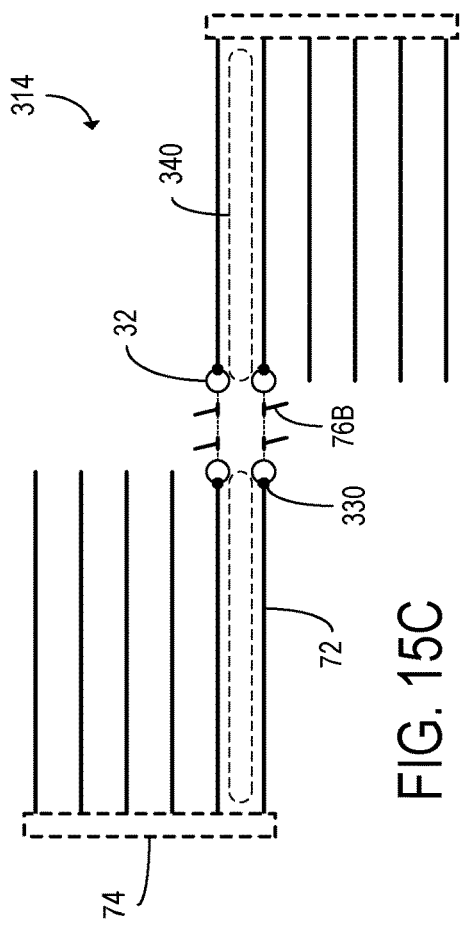

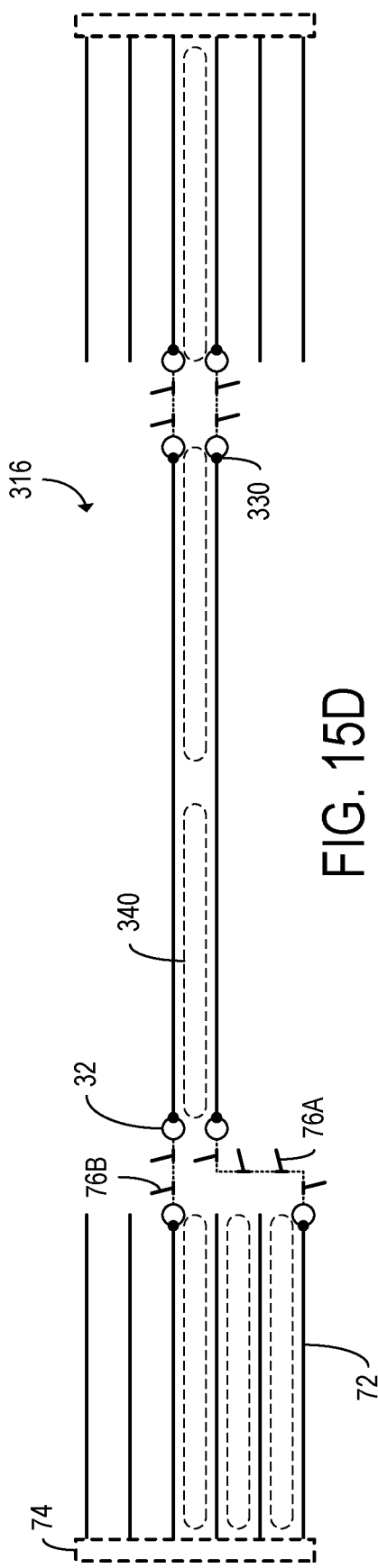
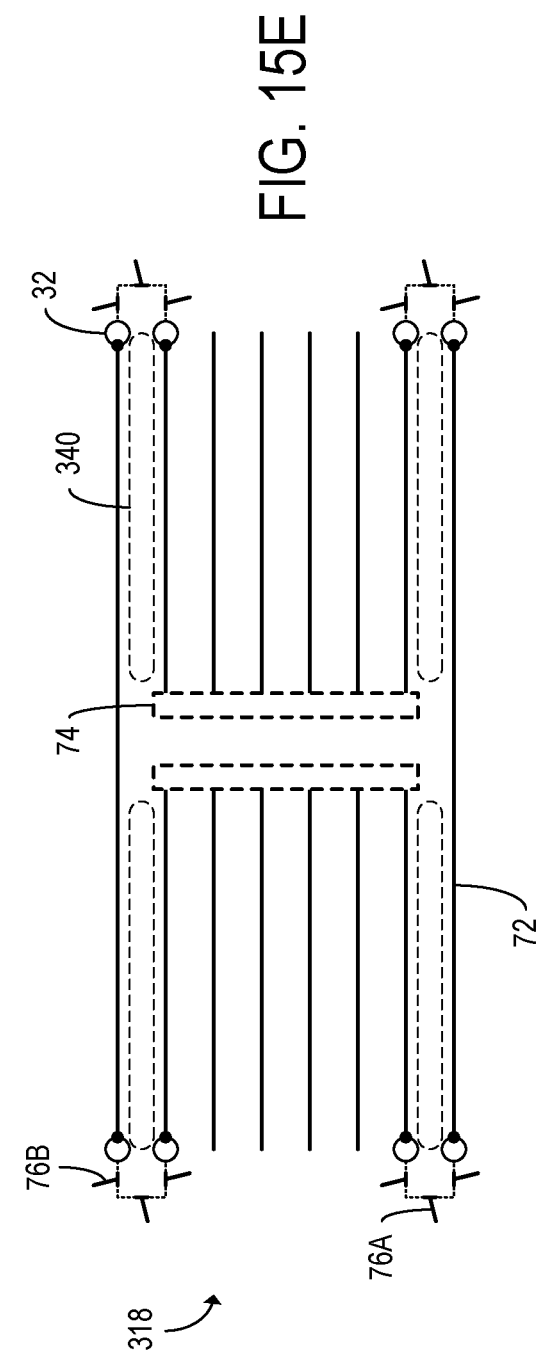

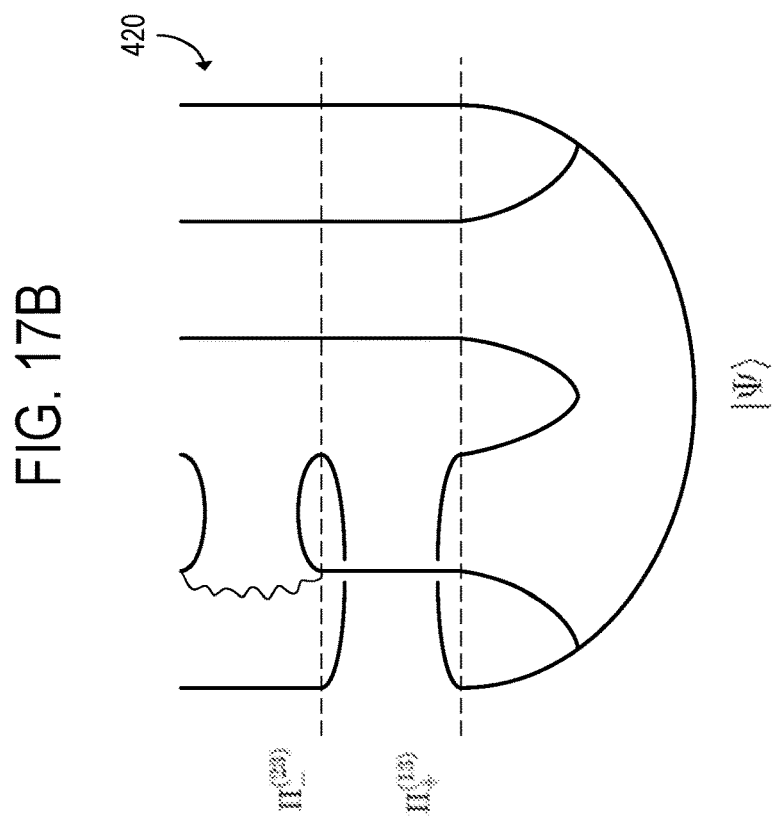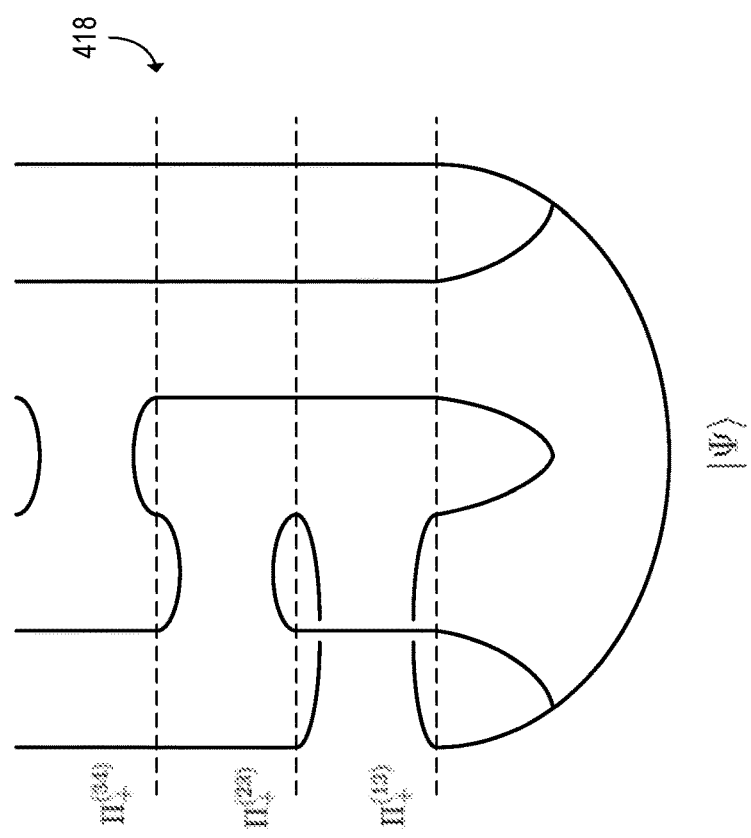

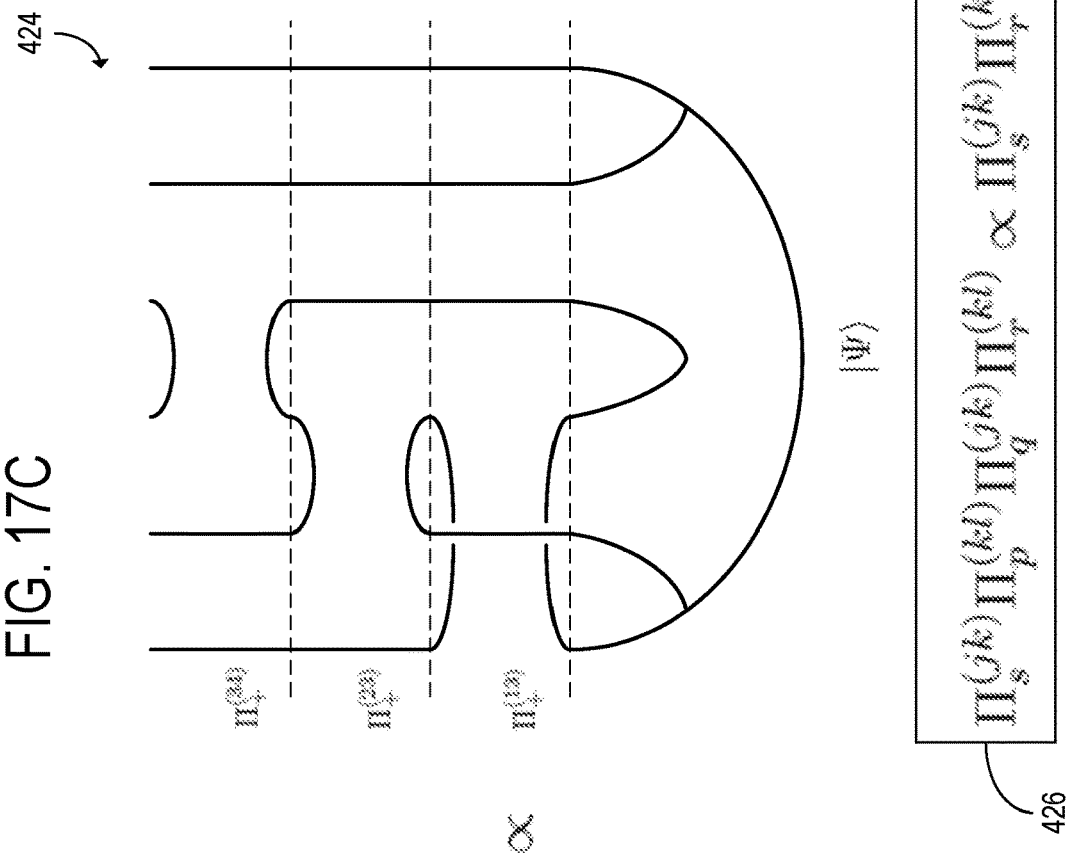
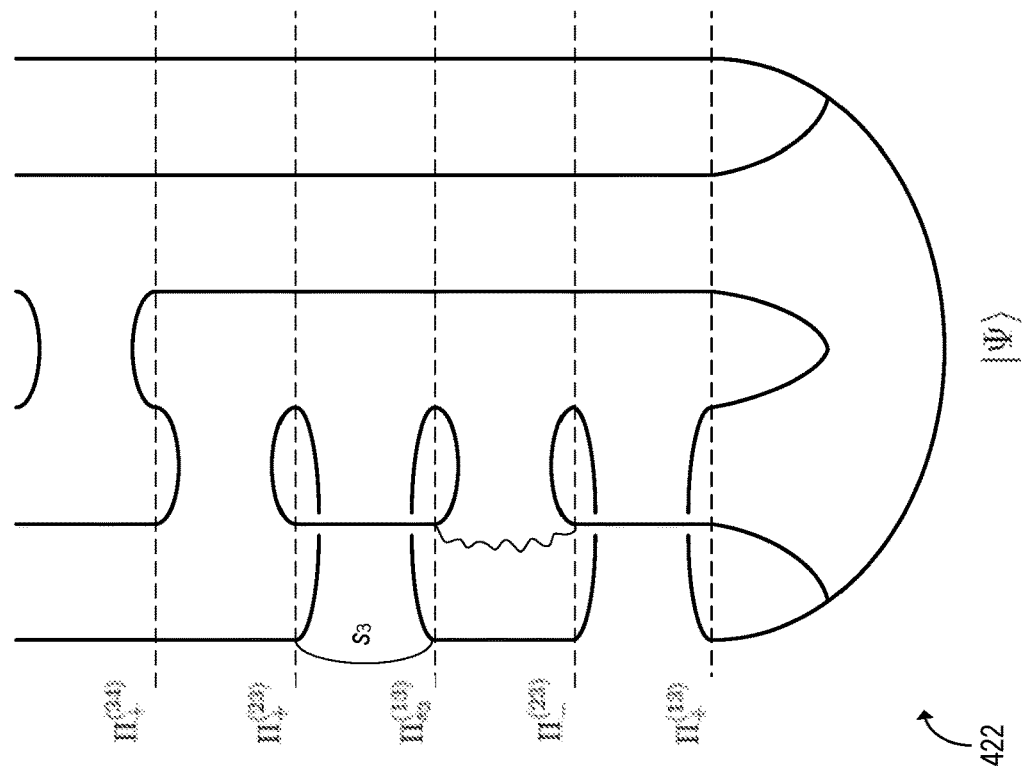
FIG. 17C

FIG. 18

$$\Pi_s^{(jk)} \Pi_r^{(kl)} = \Pi_s^{(jk)} \Pi_{r_n-1}^{(kl)} \Pi_{s_{n-1}}^{(jk)} \cdots \Pi_{r_3}^{(kl)} \Pi_{s_2}^{(jk)} \Pi_{r_2}^{(kl)} \Pi_{s_1}^{(jk)} \Pi_{r_1}^{(kl)}$$

428

$$w(jk) = \exp\left(\sum_{n=1}^{\infty} 2^{-n} \ln\left[w(jk)^n w(kl)^{n-1}\right]\right) = w(jk)^2 w(kl)$$

430

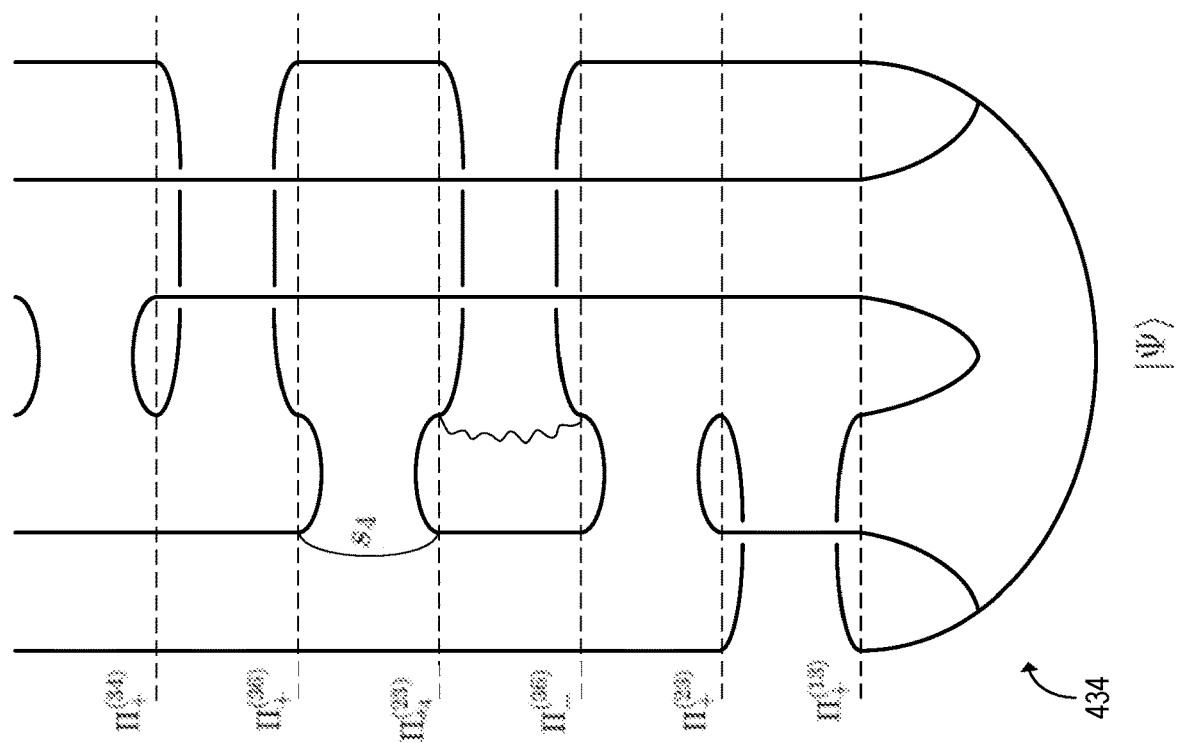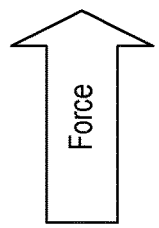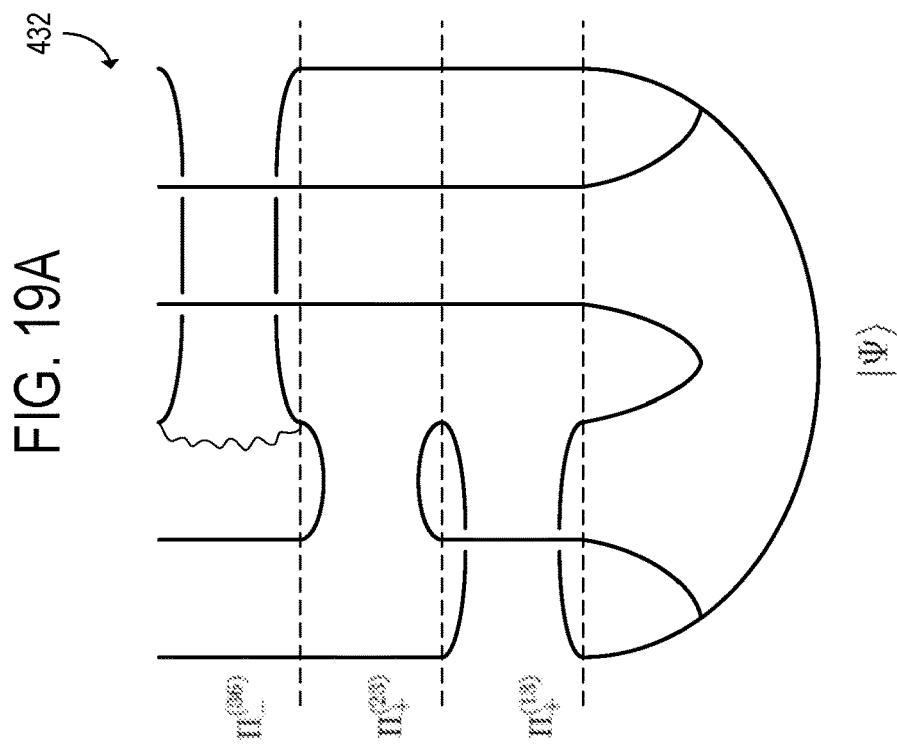

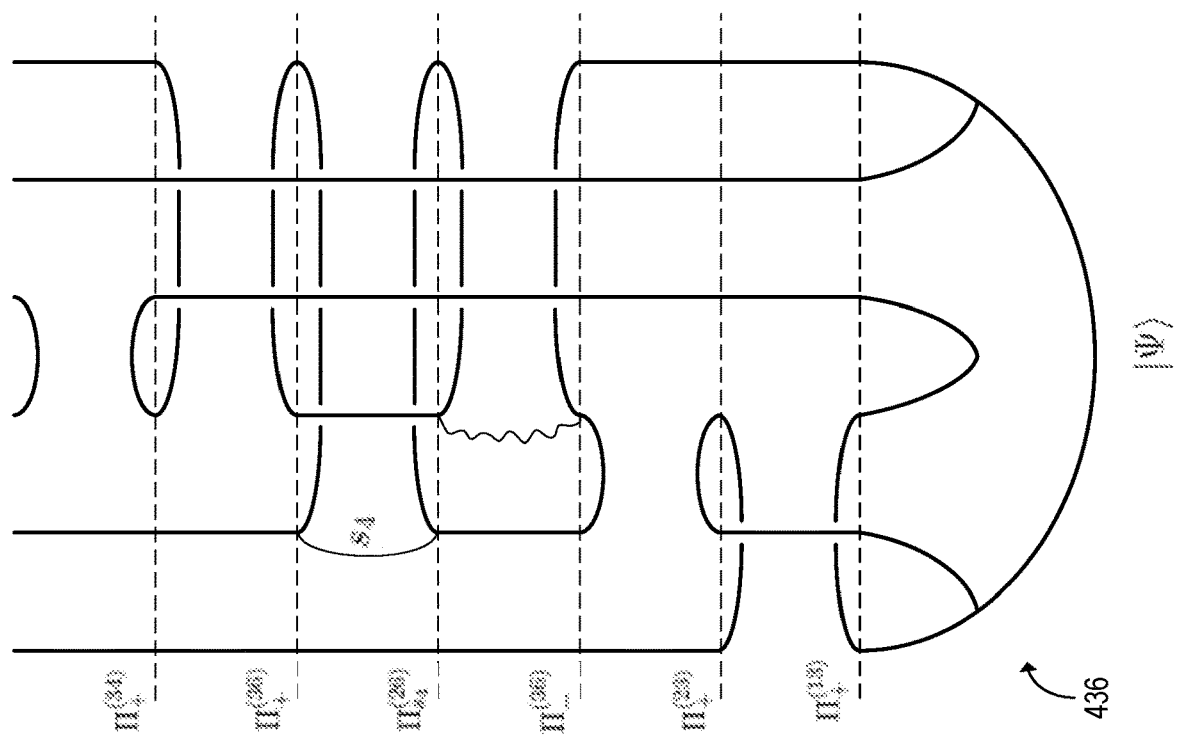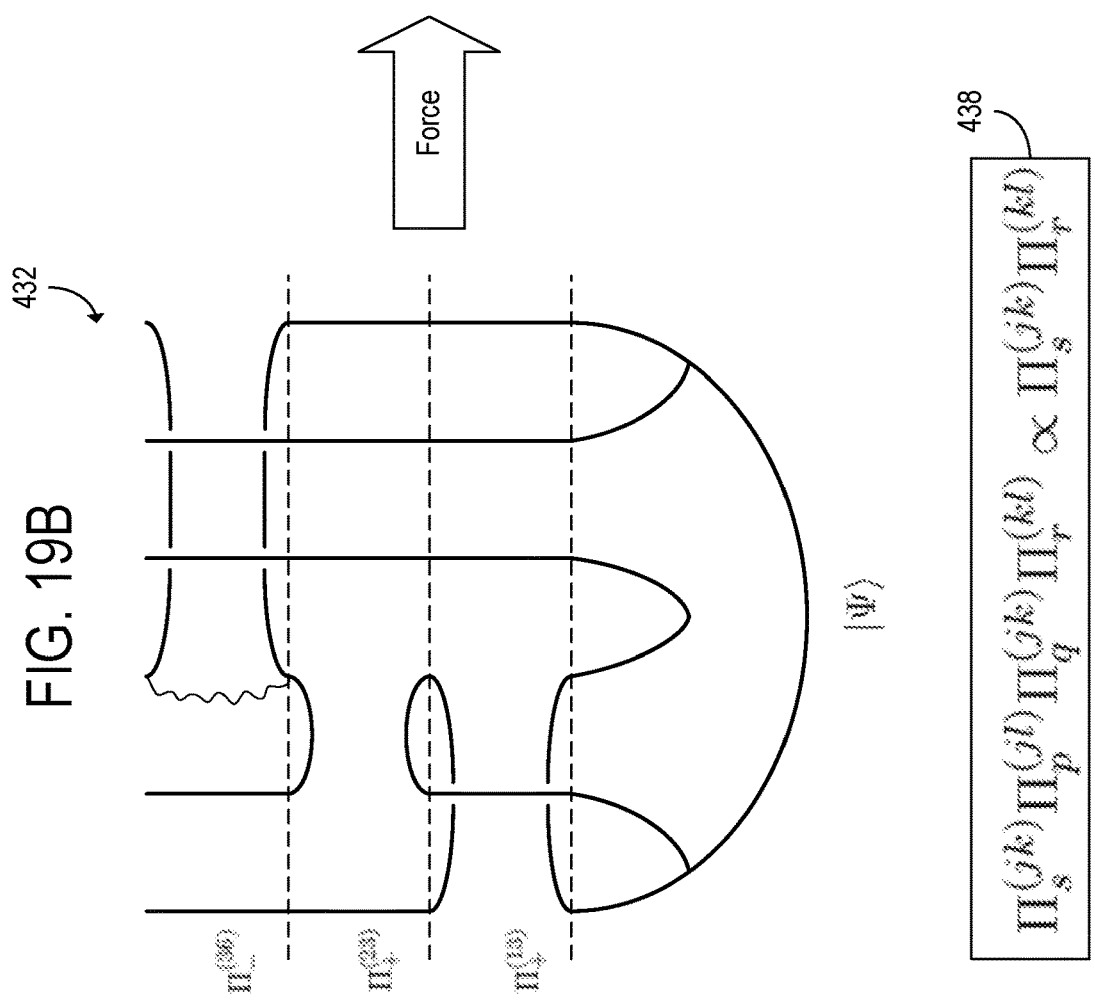
FIG. 19B $$\widehat{\Pi}_s^{(jk)} \Pi_r^{(kl)} = \Pi_s^{(jk)} \Pi_{p_{n-1}}^{(jl)} \Pi_{s_{n-1}}^{(jk)} \cdots \Pi_{p_2}^{(jl)} \Pi_{s_2}^{(jk)} \Pi_{p_1}^{(jl)} \Pi_{s_1}^{(jk)} \Pi_r^{(kl)}$$

FIG. 20

$$\widehat{w}(jk) = w(jk)^2 w(jl)$$

$$\Pi_{s_4}^{(\mathcal{M}_2)} \Pi_{s_3}^{(\mathcal{M}_3)} \Pi_{s_2}^{(\mathcal{M}_2)} \Pi_{s_1}^{(\mathcal{M}_1)} \propto \Pi_{s_4}^{(\mathcal{M}_2)} \Pi_{s_1}^{(\mathcal{M}_1)}$$

$$\Pi_{s_4}^{(\mathcal{M}_2)} \Pi_{s_3}^{(\mathcal{M}_3)} \Pi_{s_2}^{(\mathcal{M}_2)} \Pi_{s_1}^{(\mathcal{M}_1)} = \Pi_{s_4}^{(\mathcal{M}_2)} \frac{1 + s_3 \Gamma_{\mathcal{M}_3} \Pi_{s_2}^{(\mathcal{M}_2)} \Pi_{s_1}^{(\mathcal{M}_1)}}{2}$$
$$= \frac{1}{2} \Pi_{s_4}^{(\mathcal{M}_2)} \left( \Pi_{s_2}^{(\mathcal{M}_2)} + \Pi_{-s_2}^{(\mathcal{M}_2)} s_3 \Gamma_{\mathcal{M}_3} \right) \Pi_{s_1}^{(\mathcal{M}_1)}$$
$$= \frac{1}{2} \Pi_{s_4}^{(\mathcal{M}_2)} (s_3 \Gamma_{\mathcal{M}_3})^{\frac{1-s_2 s_3}{2}} \Pi_{s_1}^{(\mathcal{M}_1)}.$$

$$\mathcal{M}_3 = \mathcal{M}_1 \quad \text{or} \quad \mathcal{M}_3 = (\mathcal{M}_1 \bigcup \mathcal{M}_2) \setminus (\mathcal{M}_1 \bigcap \mathcal{M}_2)$$

FIG. 21

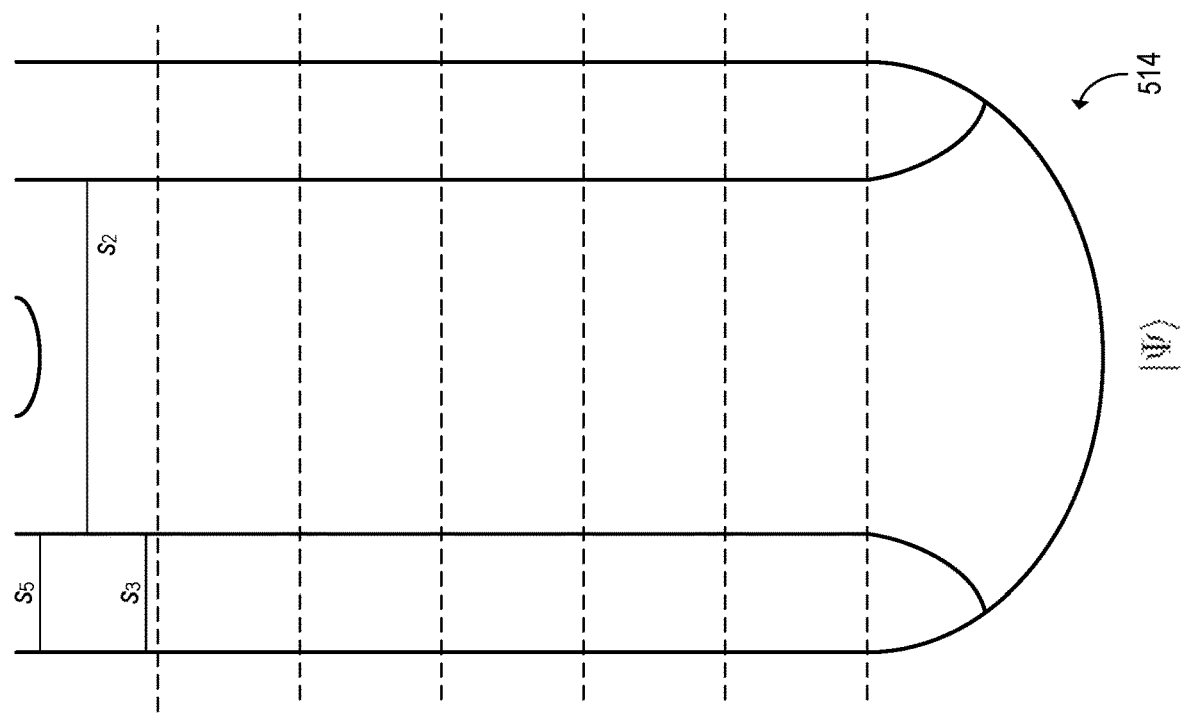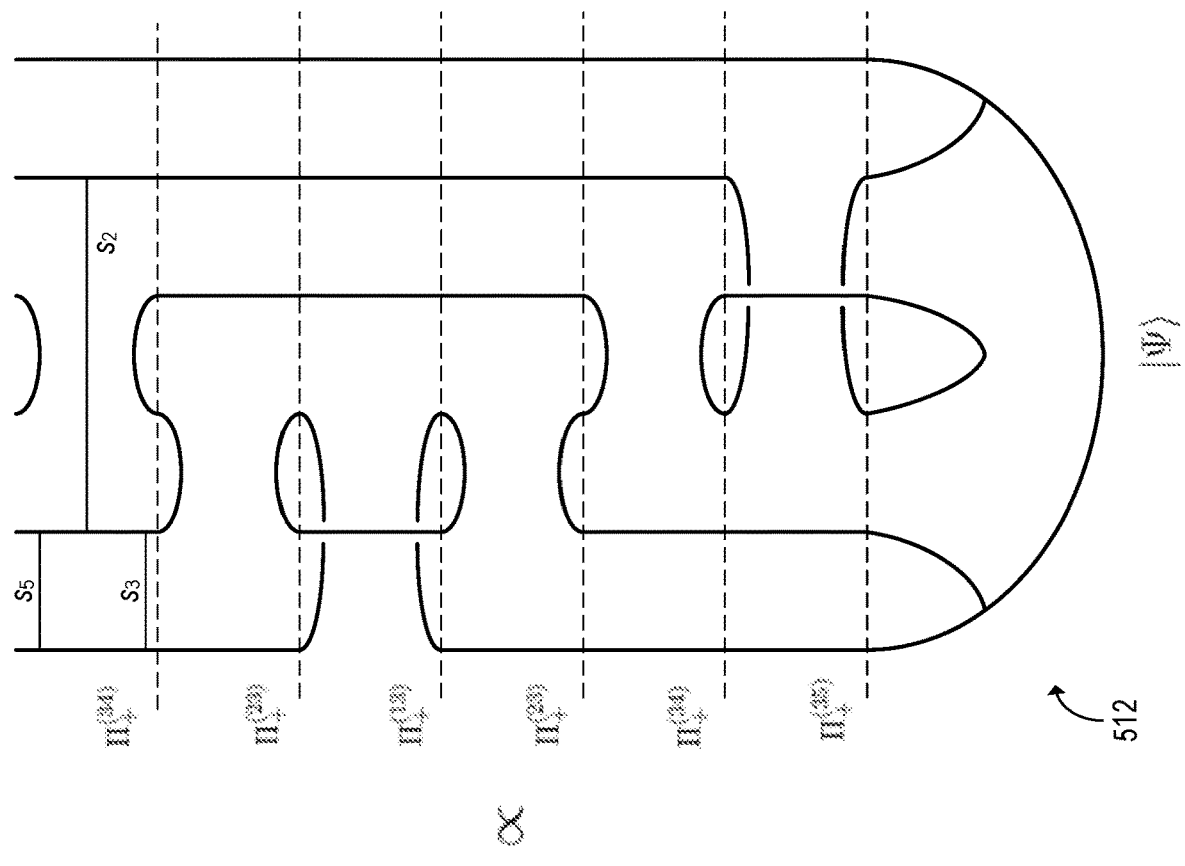
FIG. 24B $$w(\mathcal{G}) = \prod_{\mu=1}^{n} w(\mathcal{M}_\mu)$$

526

$$[\mathcal{G}] := \{\mathcal{G}' \in \mathcal{C}_N \mid \exists P \in \mathcal{P}_N : \mathcal{G}' = P\mathcal{G}\}$$

$$\mathcal{G}_{(+,\vec{s},+)} = \Pi_+^{(\text{anc})} \Pi_{s_1}^{(\mathcal{M}_1)} \ldots \Pi_{s_{n-1}}^{(\mathcal{M}_{n-1})} \Pi_+^{(\text{anc})}$$

530

$$w(\mathcal{G}_{(+,\vec{s},+)}) = \prod_{\mu=1}^{n} w(\mathcal{M}_\mu) \prod_{\mu \in F_1} \frac{\tilde{w}(\mathcal{M}_\mu)}{w(\mathcal{M}_\mu)} \prod_{\mu \in F_2} \frac{\tilde{w}(\mathcal{M}_\mu)}{w(\mathcal{M}_\mu)}$$

MEASUREMENT SEQUENCE DETERMINATION FOR QUANTUM COMPUTING DEVICE

BACKGROUND

Recent experiments have established the existence of Majorana zero modes (MZMs) in hybrid semiconductor-superconductor heterostructures. MZMs have been investigated as a platform for realizing topological quantum computation. A current line of research into topological quantum computing using MZMs aims to assemble a network of topological superconductors in a way that allows practical quantum information processing on many qubits.

SUMMARY

According to one aspect of the present disclosure, a computing system is provided, including a processor configured to identify a plurality of measurement sequences that implement a logic gate. Each measurement sequence may include a plurality of measurements of a quantum state of a topological quantum computing device. The processor may be further configured to determine a respective estimated total resource cost of each measurement sequence of the plurality of measurement sequences. The processor may be further configured to determine a first measurement sequence that has a lowest estimated total resource cost of the plurality of measurement sequences. The topological quantum computing device may be configured to implement the logic gate by applying the first measurement sequence to the quantum state.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 6 shows joint fermionic parity operators expressed in terms of Pauli matrices, according to the embodiment of FIG. 1.

FIG. 9 shows diagrammatical representations of example measurement sequences of Majorana hexons, according to the embodiment of FIG. 1.

FIG. 13 shows a measurement sequence that generates a two-qubit logic gate, according to the embodiment of FIG. 1.

FIGS. 14A-14C show example fermionic parity measurement configurations in a two-sided Majorana hexon architecture, according to the embodiment of FIG. 2.

FIG. 14D shows an estimated weighted measurement cost for a fermionic parity measurement, according to the embodiment of FIG. 2.

FIGS. 15A-15E show example fermionic parity measurement configurations in a one-sided Majorana hexon architecture, according to the embodiment of FIG. 3.

FIG. 17A shows a diagram of a projection operator sequence, according to the embodiment of FIG. 1.

FIG. 17B shows a diagram of a projection operator sequence after a measurement of an undesired parity of a projection operator has been performed, according to the embodiment of FIG. 17A.

FIG. 17C shows a diagram of a forced measurement applied to the projection operator sequence of FIG. 17B.

FIG. 18 shows an estimated total resource cost for a measurement sequence in which a forced measurement occurs, according to the embodiment of FIGS. 16A-B.

FIG. 19A-19B show diagrams of example measurement sequences in which an alternative forced measurement protocol is applied to the quantum state, according to the embodiment of FIG. 1.

FIG. 20 shows an estimated total resource cost for a measurement sequence in which the alternative forced measurement protocol is applied, according to the embodiment of FIGS. 19A-B.

FIG. 21 shows an example measurement sequence that occurs when forced measurement is used on four Majorana zero modes of a Majorana hexon, according to the embodiment of FIG. 1.

FIGS. 24A-24B show diagrams of measurement sequences that differ only by overall Pauli operators, according to the embodiment of FIG. 23.

FIG. 26 shows the estimated total resource cost of the measurement sequence of FIG. 25 when a Majorana-Pauli tracking protocol is used.

FIG. 27 shows the estimated total resource cost of the measurement sequence of FIG. 25 when a forced measurement protocol is used.

DETAILED DESCRIPTION

Measurement-only topological quantum computation is one approach to topological quantum computation that is well-suited to implementation using Majorana zero modes (MZMs). Measurement-only topological quantum computation allows computations to be performed without physically moving the MZMs, which are typically bound to macroscopic defects (such as the ends of wires, as discussed in further detail below) and may be difficult to move. Instead, braiding transformations may be performed through a series of (potentially non-local) measurements on sets of MZMs involving the MZMs that encode the computational state that is to be manipulated and another set of MZMs that serve as ancillary degrees of freedom. The MZMs may, in some architectures, be coupled to quantum dots, thus allowing the states of the MZMs to be measured by measuring the effects of the MZMs on the energy spectra of the quantum dots.

Using MZMs, a Clifford gate (for example, a Hadamard gate, a π/4 phase gate, or a controlled not gate) may be constructed in a quantum computing device. In order to perform universal quantum computation, an additional gate such as a T-gate (a π/8 phase gate) may additionally be implemented. The Clifford gate may be topologically protected such that perturbations to the quantum state are suppressed when the Clifford gate is implemented. The T-gate may not be topologically protected in such configurations.

Each Clifford gate implemented at the quantum computing device may be compiled from a sequence of measurements of the quantum state. According to previous approaches for constructing a Clifford gate from a sequence of measurements, a measurement sequence with minimal length is generated for each of the basic braiding transformations for each qubit. In such approaches, a minimal-length measurement sequence for a two-qubit entangling gate is then generated for each pair of qubits, and the resulting gate set is used as a generating gate set to synthesize any other Clifford gates. However, this approach may be inefficient, since there may exist shorter sequences of measurements that compile to the same gate.

Figure 1:
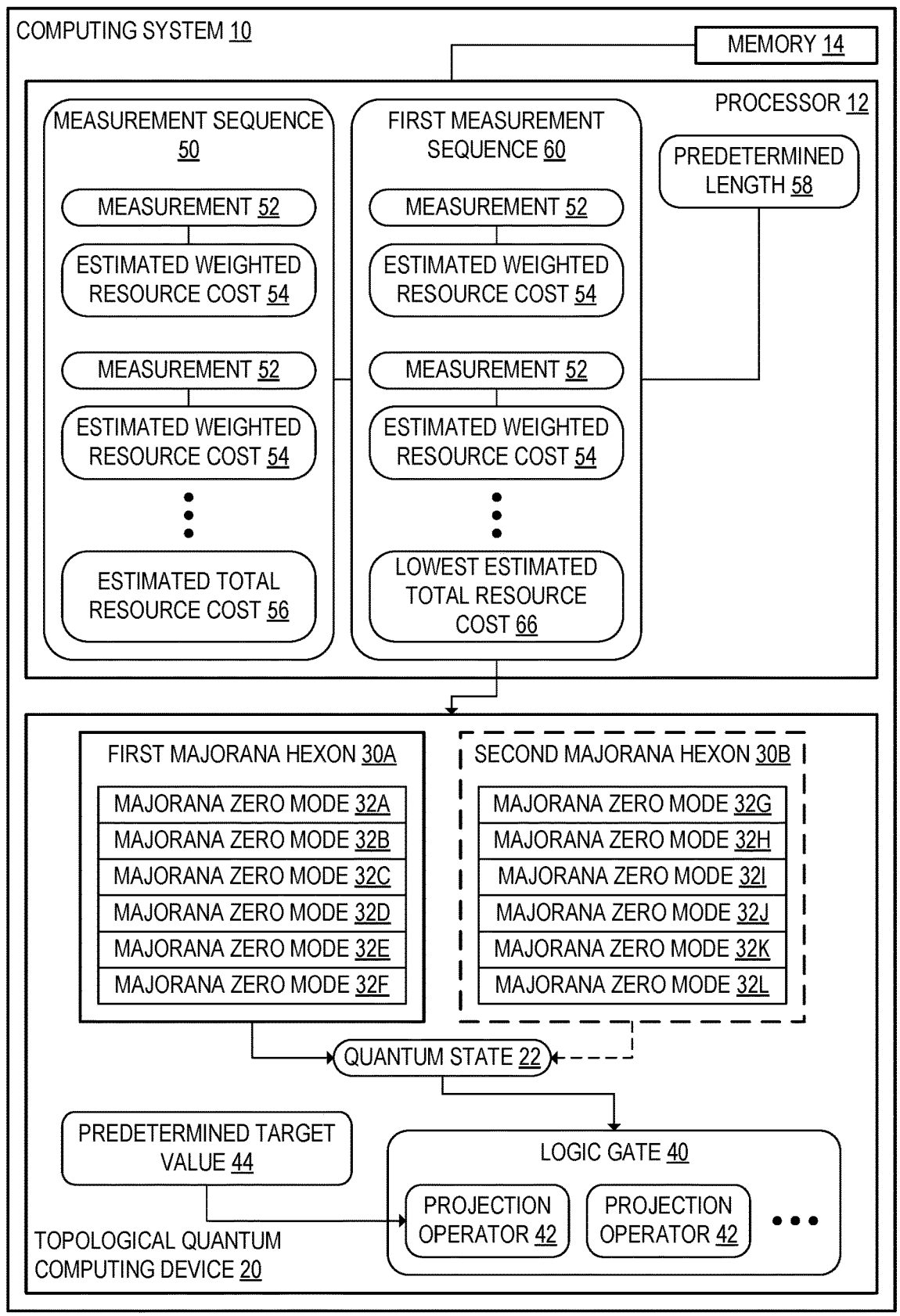
FIG. 1 shows an example quantum computing system including a processor and a topological quantum computing device, the topological quantum computing device including two Majorana hexons, according to one embodiment of the present disclosure.

In order to address the above inefficiency of existing methods for compiling Clifford gates in topological quantum computing devices, a computing system 10 is provided, as shown in the example embodiment of FIG. 1. The computing system 10 may include a processor 12 and memory 14, which may be operatively coupled. The processor 12 and memory 14 may be included in a classical computing device. The computing system 10 may further include other hardware components such as one or more input devices, one or more output devices, and/or one or more communication devices. In some embodiments, the functions of the computing system 10 may be distributed across a plurality of communicatively coupled computing devices.

As discussed in further detail below, the processor 12 may be configured to identify a plurality of measurement sequences 50 that implement a logic gate 40. The logic gate 40 may be a one-qubit Clifford gate or a multi-qubit Clifford gate. In some embodiments, as shown in the example of FIG. 1, the computing system 10 may include a topological quantum computing device 20 having a quantum state 22. Each measurement sequence 50 of the plurality of measurement sequences 50 may include a plurality of measurements 52 of the quantum state 22 of the topological quantum computing device 20. In such embodiments, the processor 12 may be operatively coupled to the topological quantum computing device 20 and may be configured to transmit one or more measurement sequences 50 to the topological quantum computing device 50 to implement the one or more logic gates 40. In other embodiments, the processor 12 may be configured to identify the plurality of measurement sequences 50 for later use with a topological quantum computing device 20 when the computing system 10 does not include a topological quantum computing device 20.

The processor 12 may be further configured to determine a respective estimated total resource cost 56 of each measurement sequence 50 of the plurality of measurement sequences 50. The estimated total resource cost 56 of a measurement sequence 50 may, for example, indicate an amount of time or an amount of energy that implementing the logic gate 40 with the measurement sequence 50 is estimated to consume. Additionally or alternatively, the estimated total resource cost 56 may indicate an error rate of the measurement sequence 50.

In some embodiments, for each measurement sequence 50 of the plurality of measurement sequences 50, the processor 12 may be configured to determine the respective estimated total resource cost 56 at least in part by determining an estimated weighted resource cost 54 of each measurement 52 included in the measurement sequence 50. For example, the estimated weighted resource cost 54 of each measurement 52 may indicate an error rate of the measurement 52. The processor 12 may then be further configured to determine the estimated total resource cost 56 of the measurement sequence 50 based on the plurality of estimated weighted resource costs 54 of the individual measurements 52. For example, the estimated total resource cost 56 may be the product of the estimated weighted resource costs 54.

Once the respective estimated total resource costs 56 of the plurality of measurement sequences 50 have been determined, the processor 12 may be further configured to determine a first measurement sequence 60 that has a lowest estimated total resource cost 66 of the plurality of measurement sequences 50. The processor 12 may, in some embodiments, be further configured to transmit the first measurement sequence 60 to the topological quantum computing device 20 so that the topological quantum computing device 20 may implement the logic gate 40 by applying the first measurement sequence 60 to the quantum state 22.

The topological quantum computing device 20 may include one or more Majorana hexons, as shown in FIG. 1. The example of FIG. 1 shows a first Majorana hexon 30A. In some embodiments, the topological quantum computing device 20 may further include a second Majorana hexon 30B. Each Majorana hexon may include six Majorana zero modes (MZMs). The first Majorana hexon 30A includes Majorana zero modes 32A, 32B, 32C, 32D, 32E, and 32F. The second Majorana hexon 30B includes Majorana zero modes 32G, 32H, 32I, 32J, 32K, and 32L. In some embodiments, the topological quantum computing device 20 may include more than two Majorana hexons.

Figure 2:
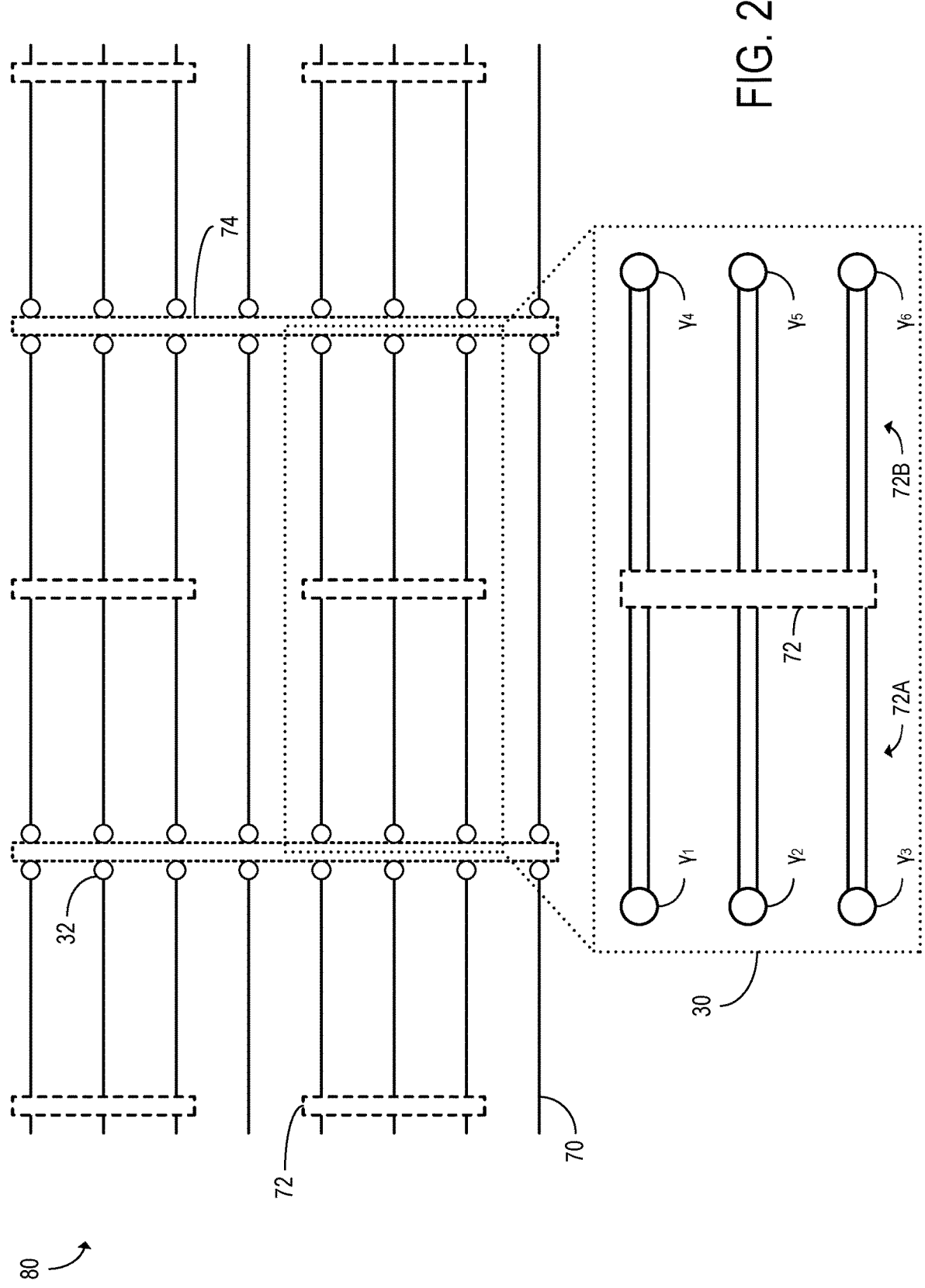
FIG. 2 shows an example two-sided Majorana hexon architecture, according to the embodiment of FIG. 1.
Figure 3:
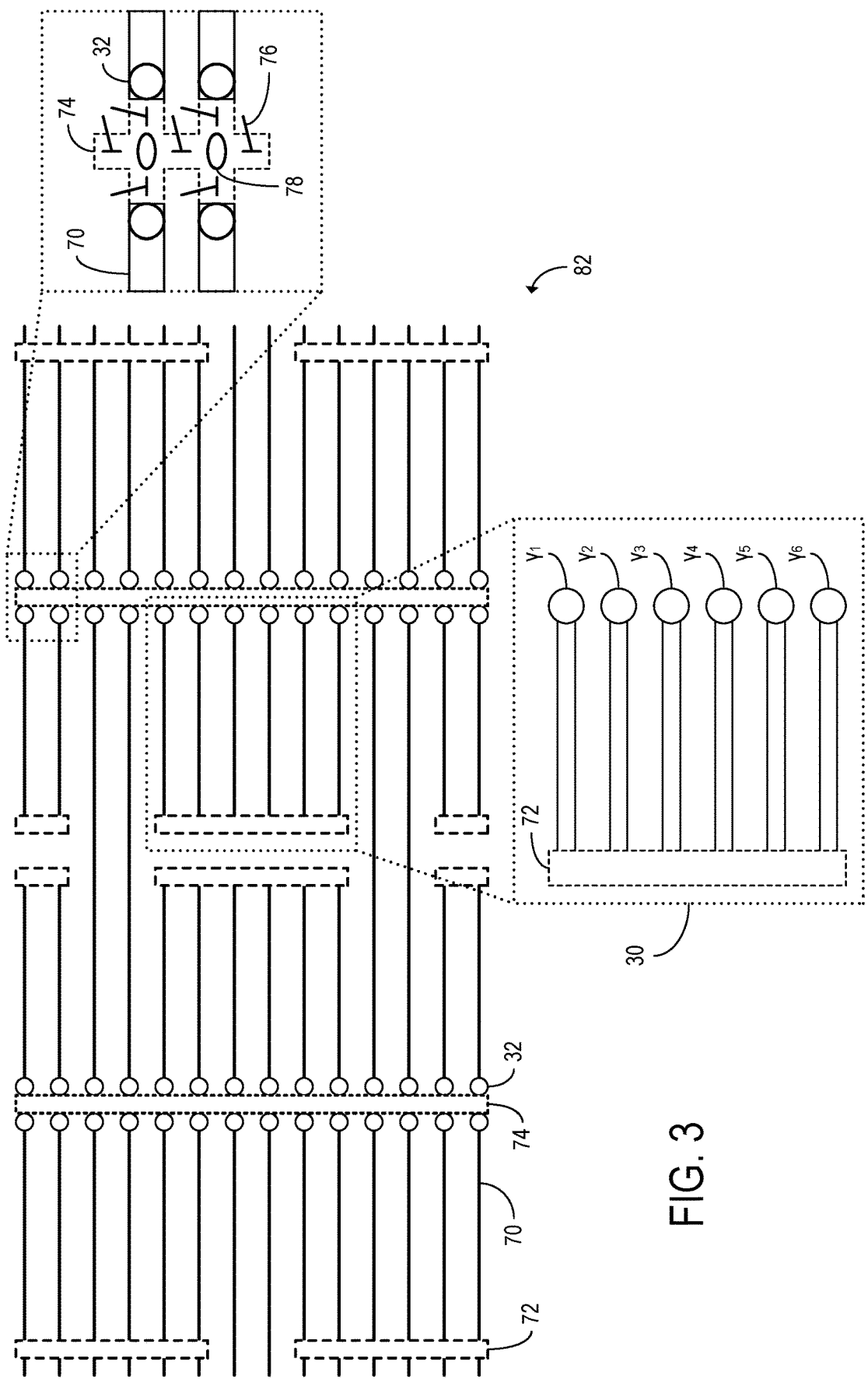
FIG. 3 shows an example one-sided Majorana hexon architecture, according to the embodiment of FIG. 1.

Example structures that may be included in the topological quantum computing device 20 to implement one or more qubits are shown in FIGS. 2 and 3. The topological quantum computing device 20 may instantiate the plurality of MZMs 32 in a one-sided architecture or a two-sided architecture. FIG. 2 shows an example of a two-sided Majorana hexon architecture 80. In the embodiment of FIG. 2, the MZMs 32 included in each Majorana hexon 30 are coupled by a topological superconductor 70 and a superconductor 72. Within each Majorana hexon 30, the superconductor 72 is located between a first side 72A on which three MZMs 32 (labeled $\gamma_1$, $\gamma_2$, and $\gamma_3$) are located and a second side 72B on which the other three MZMs 32 (labeled $\gamma_4$, $\gamma_5$, and $\gamma_6$) are located. The two-sided Majorana hexon architecture 80 of FIG. 2 includes a plurality of Majorana hexons 30, and further includes a semiconductor 74 that is located between adjacent Majorana hexons 30 and is coupled to the topological superconductor 70. Each MZM 32 may form at a junction between the topological superconductor 70 and the semiconductor 74. When the two-sided Majorana hexon architecture 80 of FIG. 2 is used, each Majorana hexon 30 may have a square lattice connectivity in which each Majorana hexon 30 may be entangled with its vertical and horizontal neighbors.

An example a one-sided Majorana hexon architecture 82 is shown in the example of FIG. 3. In the one-sided Majorana hexon architecture 82, each MZM 32 included in a Majorana hexon 30 is located on the same side of the superconductor 72. As in the example embodiment of FIG. 2, each MZM 32 may be formed at a junction between a topological superconductor 70 and a semiconductor 74. FIG. 3 further shows a close-up view of a portion of the semiconductor 74 in the one-sided Majorana hexon architecture 82. In the example of FIG. 3, a plurality of quantum dots 78 are embedded within the semiconductor 74 proximate the MZMs 32. In addition, the close-up view of the portion of the semiconductor 74 shows a plurality of cutter gates 76 located between the quantum dots 78 and the MZMs 32 and between pairs of quantum dots 78. The cutter gates 76 and the quantum dots 78 are described in further detail below.

In the one-sided Majorana hexon architecture 82 of FIG. 3, the plurality of Majorana hexons 30 may have an asymmetric square lattice connectivity in which the one-sided Majorana hexon architecture 82 does not have vertical reflection symmetry. Thus, two-qubit gates acting on horizontally displaced qubits may have different leftward and rightward operations. A two-qubit gate included in the two-sided Majorana hexon architecture 80 of FIG. 2 may also have different leftward and rightward operations if the labeling of the MZMs 32 is asymmetric under left-right reflection.

In the two-sided Majorana hexon architecture 80 and the one-sided Majorana hexon architecture 82, each Majorana hexon 30 may be galvanically isolated from other Majorana hexons 30. Thus, each Majorana hexon 30 may have a charging energy $E_C$ resulting from Coulomb interactions. The charging energy of each Majorana hexon 30 may reduce the probability of quasiparticle poisoning of that Majorana hexon 30, since the probability for an electron to tunnel onto or off of the island is exponentially suppressed in the ratio of the charging energy $E_C$ to temperature, $\exp(-E_C/k_B T)$, where T is the temperature of the Majorana hexon 30 and $k_B$ is Boltzmann's constant.

Projective measurements of the joint fermionic parity of any two MZMs 32 may be performed by enabling weak coherent single-electron tunneling between the MZMs 32 included in the pair and the quantum dots 78 adjacent to those MZMs 32. This coupling gives rise to a shift in the energy spectrum and charge occupation of the dot, which may then be measured. This measurement may be topologically protected in the sense that the operator that is being measured is known up to corrections that are exponentially small in the separation distance, through the superconductor 72 and the topological superconductor 70, of MZMs 32 in the pair. However, measurement fidelity may be limited by the signal-to-noise ratio and decoherence of the qubit.

Figure 4:
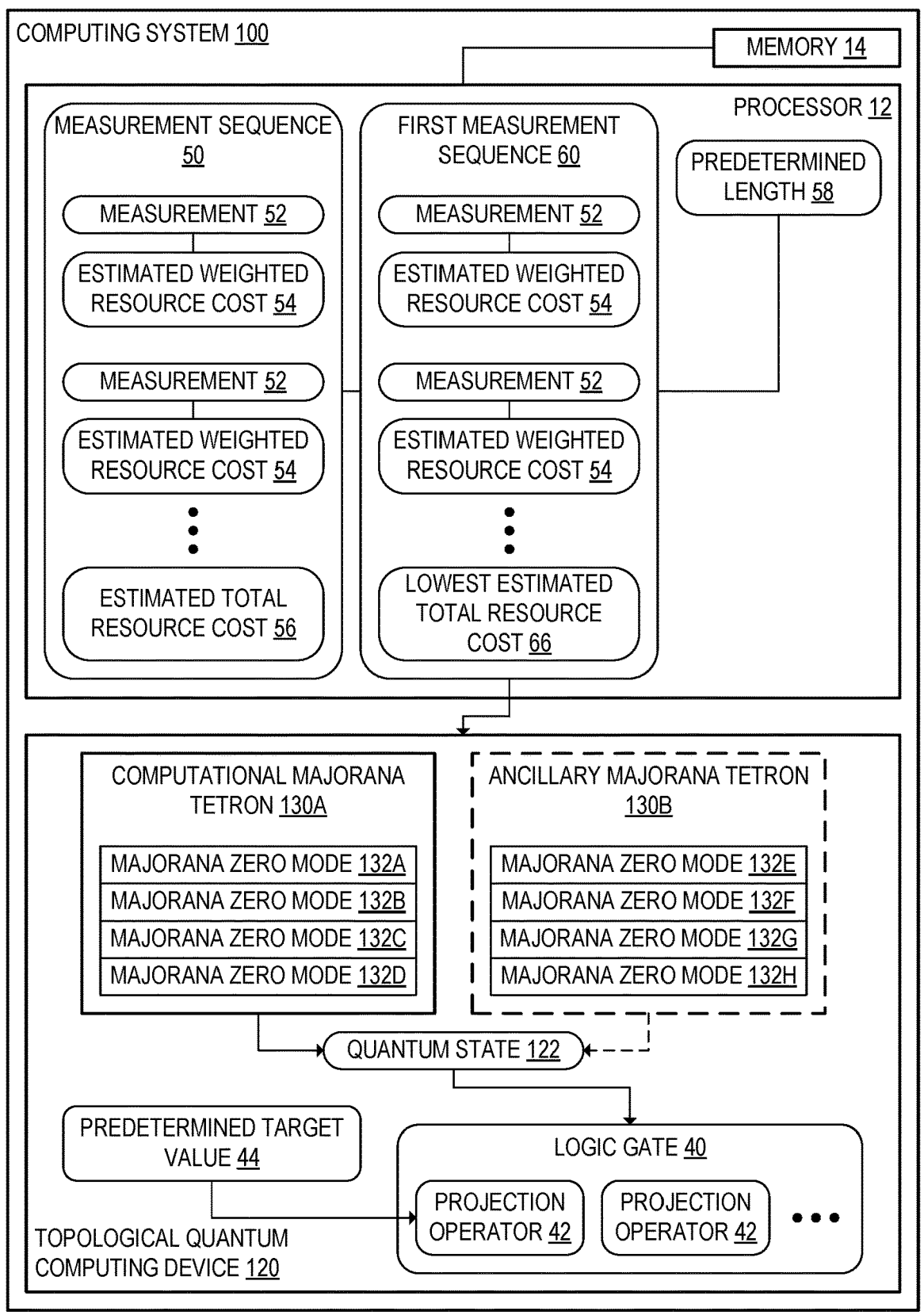
FIG. 4 shows an example quantum computing system including a processor and a topological quantum computing device, the topological quantum computing device including two Majorana tetrons, according to another embodiment of the present disclosure.

In each Majorana hexon 30, a qubit may be formed from four MZMs 32. The remaining two MZMs 32 included in the Majorana hexon 30 may be used as ancillary MZMs 32 when performing measurement-based topological operations, as discussed in further detail below. In other embodiments, additionally or alternatively to a Majorana hexon 30, the topological quantum computing device may include two Majorana tetrons. FIG. 4 shows an example computing system 100 including a topological quantum computing device 120 with a quantum state 122. The topological quantum computing device 120 of FIG. 4 includes two Majorana tetrons. In the embodiment of FIG. 4, one Majorana tetron is a computational Majorana tetron 130A that encodes a computational qubit and the other Majorana tetron is an ancillary Majorana tetron 130B that encodes an ancillary qubit. The computational Majorana tetron 130A includes four Majorana zero modes 132A, 132B, 132C, and 132D. The ancillary Majorana tetron 130B includes Majorana zero modes 132E, 132F, 132G, and 132H. In other embodiments, the topological quantum computing device 120 may include some other number of Majorana tetrons.

In other embodiments not shown in the figures, the topological quantum computing device 20 may include one or more Majorana octons that each include eight MZMs 30.

Some measurements 52 of the quantum state 22 may be more difficult to perform than other measurements 52. As discussed above, the difficulty of performing a measurement 52 may be indicated by an estimated weighted resource cost 54 of that measurement 52. In the two-sided Majorana hexon architecture 80 of FIG. 2, some measurements 52 may be performed between MZMs 32 on the same side (left or right) of the Majorana hexon 30. Other measurements may be performed between MZMs 32 on opposite sides of the Majorana hexon 30. When the MZMs 32 have a greater separation distance, enabling coherent single-electron tunneling between these MZMs 32 and a common quantum dot 78 may be more difficult, since the distance between the MZMs 32 may exceed the phase coherence length of the semiconductor 74. Thus, the estimated weighted resource cost 54 of a measurement 52 may increase with increasing distance between the MZMs 32 for which the measurement 52 is performed. In some embodiments, the Majorana hexon 30 may include at least one coherent superconducting link between a pair of non-adjacent MZMs 32 in order to facilitate coherent single-electron tunneling between the non-adjacent MZMs 32.

As shown in the examples of FIGS. 2 and 3, a plurality of Majorana hexons 30 may be included in the topological quantum computing device 20. Multi-qubit operations may be performed by weakly coupling MZMs 32 from different Majorana hexons 30 to common quantum dots 78. Since the coupling is weak, the charging energy protection against quasi-particle poisoning may remain effective during such operations. The charging energy $E_C$ of each Majorana hexon 30 may be maintained during measurements 52 by performing measurements 52 of operators that commute with the charging energy $E_C$. These measurements 52 may be those that include even numbers of Majorana operators, as discussed in further detail below.

Each of the six MZMs 32 included in a Majorana hexon 30 may be labeled with subscripts 1 through 6 and may each be associated with a Majorana fermionic operator $\gamma_j$ at the jth position. The operators $\gamma_j$ may each obey the fermionic anticommutation relation $\{\gamma_j,\gamma_k\}=2\delta_{jk}$. For any ordered pair of MZMs 32 j and k, their joint fermionic parity operator is given by $i\gamma_j\gamma_k=-i\gamma_k\gamma_j$, which has eigenvalues $p_{jk}=\pm 1$ for even and odd parity respectively. The fermionic parity of an MZM 32 is a topological charge (also known as a fusion channel) included in the quantum state 22 when the topological quantum computing device 20 includes MZMs 32. The corresponding projection operator onto the subspace with parity $s=p_{jk}=\pm 1$ is given by equation 200 in FIG. 5. In addition, the joint fermionic parity operator $i\gamma_j\gamma_k$ is expressed in terms of the positive and negative projection operators in equation 202. As further shown in FIG. 5, the joint fermionic parity operator and the even-parity and odd-parity projection operators can be expressed in a diagrammatic calculus as the diagram elements 204, 206, and 208 respectively. The joint fermionic parity operator diagram element 204 may be expressed as a wavy line between two straight lines representing the states of MZMs j and k. The joint fermionic parity operator diagram element 204 may also be written as an antisymmetric combination of the projectors 206 and 208.

In FIG. 6, equation 210 shows the basis states for a Majorana hexon 30. The ground states of the Majorana hexon 30 are assumed to have a fixed value of the collective fermionic parity due to the charging energy of the Majorana hexon 30. In the example of FIG. 6, the ground states of the Majorana hexon 30 each have an even collective fermionic parity $p_{12}p_{34}p_{56}=+1$. Thus, states with odd collective parity are excited states associated with quasiparticle poisoning. In this way, the low-energy state space of the hexon is 4-dimensional, with the basis states shown in equation 210. Thus, the Majorana hexon 30 may be viewed as a two-qubit system with a first qubit encoded by $p_{34}$ and a second qubit encoded in $p_{12}$ in which the basis states shown in equation 210 are $|0,0\rangle$, $|0,1\rangle$, $|1,0\rangle$, and $|1,1\rangle$ respectively. The joint fermionic parity operators may be expressed in terms of Pauli operators on the two qubits as shown in equation 212, where the Pauli matrices are shown in equation 214.

Figure 7:
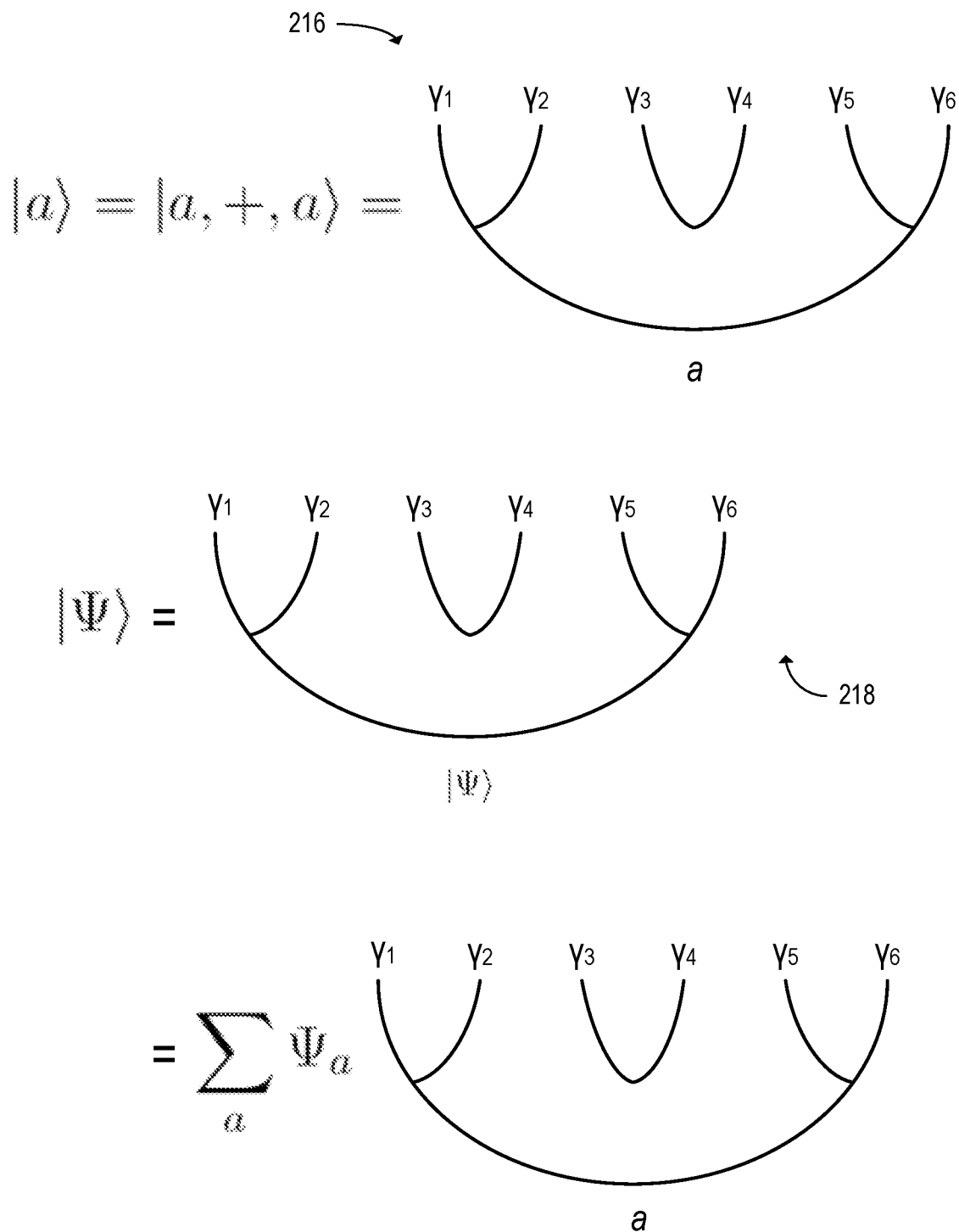
FIG. 7 shows diagrammatical representations of Majorana hexons including computational qubits and ancillary qubits, according to the embodiment of FIG. 1.

According to the convention used herein, the third MZM 32C and the fourth MZM 32D of the Majorana hexon 30A are used as ancillary MZMs with joint parity $p_{34}=+1$, and the computational qubit is encoded in $p_{12}=p_{56}$. The basis states of the computational qubit are $|0\rangle=|p_{12}=p_{56}=+\rangle$ and $|1\rangle=|p_{12}=p_{56}=-\rangle$. The designation of the ancillary MZMs 32C and 32D and the computational MZMs 32A, 32B, 32E, and 32F is represented diagrammatically in diagram 216 of FIG. 7. A general logical qubit state may be represented by the diagram 218 in FIG. 7, in which the logical qubit state is represented as a weighted sum of basis states.

A single-qubit Clifford gate may be implemented on the computational qubit in a topologically protected manner via a "measurement-only" braiding protocol. The braiding transformations may be represented in term of Majorana operators as shown in equation 220 of FIG. 8. Equation 220 shows a counterclockwise exchange of MZMs 32 at positions j and k. Using the measurement-only protocol, the single-qubit Clifford gate may be realized by sequentially measuring the joint fermionic parities of MZM pairs. These sequential measurements may be subject to the following constraints. First, the first measurement involves exactly one MZM 32 from the ancillary pair. Second, subsequent measurements involve exactly one MZM 32 from the preceding measured pair. Third, the final measurement involves the original ancillary pair and the measurement outcome equals the ancillary pair's initial joint parity, which is taken to be $p_{34}=+1$ as discussed above. Thus, sequential measurements correspond to anti-commuting parity operators, where measurements of pairs (jk) and (lm) are allowed to follow one another if and only if $i\gamma_j\gamma_k i\gamma_l\gamma_m = i\gamma_l\gamma_m i\gamma_j\gamma_k$. Each measurement sequence may be viewed as a sequence of anyonic teleportations where, in each measurement, the encoded qubit state is re-encoded in a different set of MZMs 32, and where the measured pair of MZMS 32 temporarily becomes the ancillary pair. In this view, the sequence of teleportations defines the braiding "path" and enacts the corresponding braiding transformation on the encoded state.

In some embodiments, the topological quantum computing device 20 may be configured to implement the logic gate 40 at least in part by performing a forced measurement of a projection operator 42 included in the logic gate 40. In such embodiments, the forced measurement may include performing a first measurement of a joint fermionic parity operator $i\gamma_j\gamma_k$ of the quantum state 22, as discussed above. Performing the forced measurement may further include determining whether a result of the first measurement is a predetermined target value 44. For example, the predetermined target value 44 may be the initial joint parity of the ancillary pair. When the result of the first measurement is not the predetermined target value 44, performing the forced measurement may further include repeating a second measurement 52 that was performed prior to the first measurement 52 in the measurement sequence 50. Repeating the second measurement 52 may reset the quantum state 22 to a state prior to the first measurement 52 in the measurement sequence 50. Performing the forced measurement may further include repeating the first measurement 52 of the joint fermionic parity operator. Thus, the joint fermionic parity operator $i\gamma_j\gamma_k$ may be repeatedly measured until it is measured to be equal to the predetermined target value 44.

Figure 8:
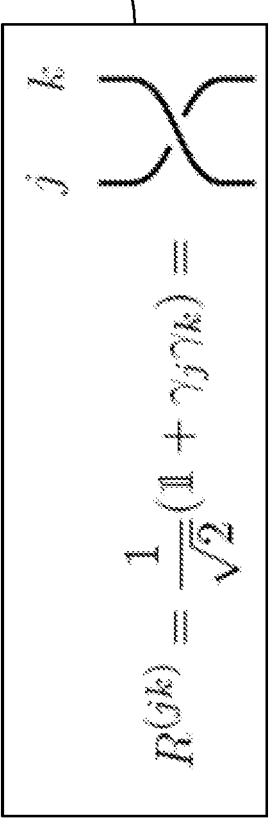
FIG. 8 shows a braiding transformation and example measurement sequences for a Majorana hexon, according to the embodiment of FIG. 1.

A sequence of projectors on a Majorana hexon 30 subject to the above constraints may generate a single-qubit Clifford gate acting on the encoded computational qubit. FIG. 8 further shows an example of a measurement sequence 50 in equation 222, where S is the $\pi/4$ phase gate. The initial measurement of the ancillary pair shown in equation 222 is redundant when the ancillary MZMs 32 are initialized with the positive parity. As another example, equation 224 shows the gate $B=S^\dagger H S^\dagger$, where H is the Hadamard gate, acting on the qubit. The gate set $\{S, B\}$ is a generating set for all single-qubit Clifford gates $C_1$.

FIG. 9 shows an example diagram 226 of a measurement sequence 50 that produces the $\pi/4$ phase gate S discussed above. FIG. 9 further shows an example diagram 228 of a measurement sequence 50 that produces the B gate. The initial measurements of the ancillary pair are omitted in both diagram 226 and diagram 228, since the parity of the ancillary pair is assumed to be initialized to $p_{34}=+1$.

Figure 10:
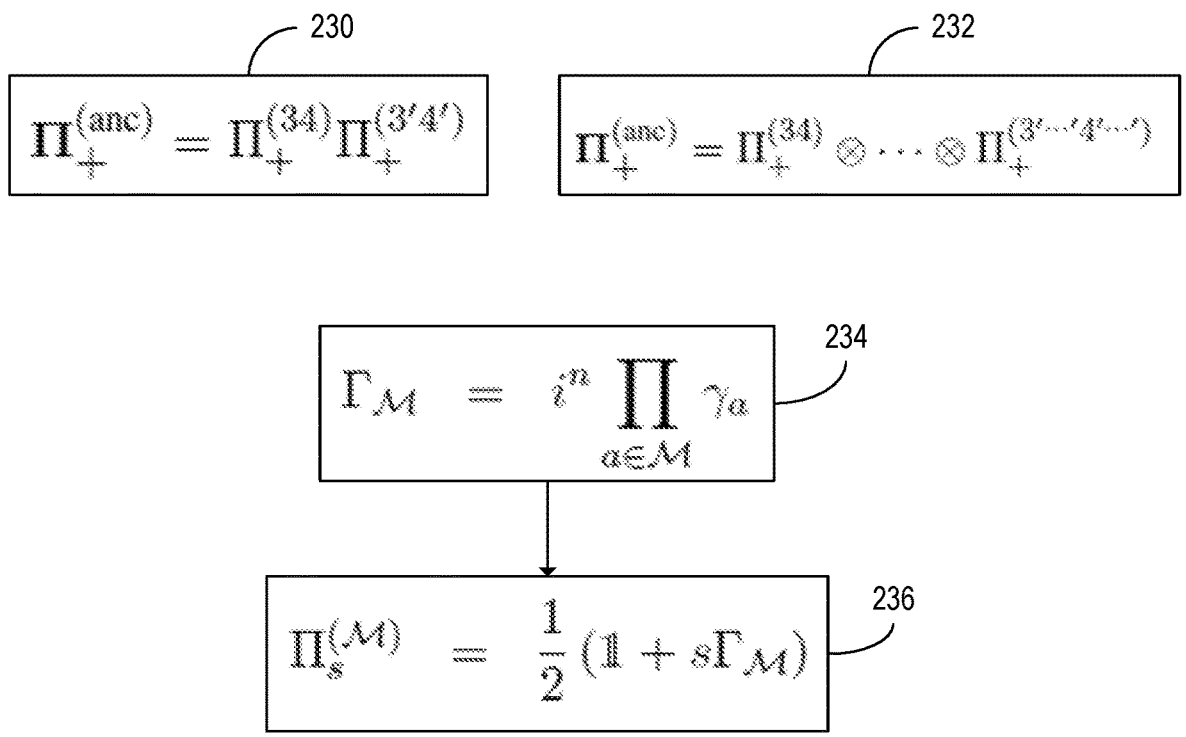
FIG. 10 shows ancillary projection operators for a Majorana hexon, according to the embodiment of FIG. 1.

Two-qubit gates may be generated from sequences of 2-MZM and/or 4-MZM projection operators. Turning now to FIG. 10, an ancillary projection operator for a two-qubit operation is defined in equation 230. The two-qubit operation may be performed at two Majorana hexons 30A and 30B. Here, the MZMs 32G, 32H, 32I, 32J, 32K, and 32L included in the second Majorana hexon 30B are labeled 1' through 6' to distinguish them from the MZMs 32A, 32B, 32C, 32D, 32E, and 32F included in the first Majorana hexon 30A. FIG. 10 further shows, in equation 232, a definition of the ancillary projection operator for operations on more than two qubits.

In addition, FIG. 10 shows a definition for a parity operator in equation 234. In equation 234, M is a set of 2N MZMs 32 of N Majorana hexons 30, including two MZMs 32 from each Majorana hexon 30. Since the particle number on each Majorana hexon 30 is preserved, each measurement operator involves an even number of Majorana operators on each Majorana hexon 30. FIG. 10 further shows a definition of a projection operator on the set M. In equation 236, s=±1.

The ancillary projection operator may begin each measurement sequence 50 when a two-qubit operation is performed. In addition, the ancillary projection operator may end each measurement sequence 50 when the two-qubit operation is performed. In the case of two-qubit operations, each measurement sequence 50 may also end with the ancillary projection operator so that both ancillary pairs end up in their respective initialized states. However, if $\Pi_+^{(34)}$ or $\Pi_+^{(3'4')}$ commutes with every term in the measurement sequence 50, then the final measurement of the respective ancillary pairs does not need to involve the corresponding measurement pairs of MZMs 32, since the measurement pairs will already be in the final ancillary state.

A system of N Majorana hexons 30 may encode N computational qubits, which is a space of dimension $2^N$. The general condition for a measurement sequence 50 of fermionic parity measurements involving N Majorana hexons 30 to compile to a unitary gate acting on the computational qubits is that the measurements 52 (which may range from 2-MZM to 2N-MZM measurements) do not read information out of the computational state. Thus, the projection operators included in the measurement sequence 50 do not collapse the encoded computational state. The measurement sequence 50 therefore may not include any projector sequences that multiply out to an operator of rank less than $2^N$.

Figure 11:
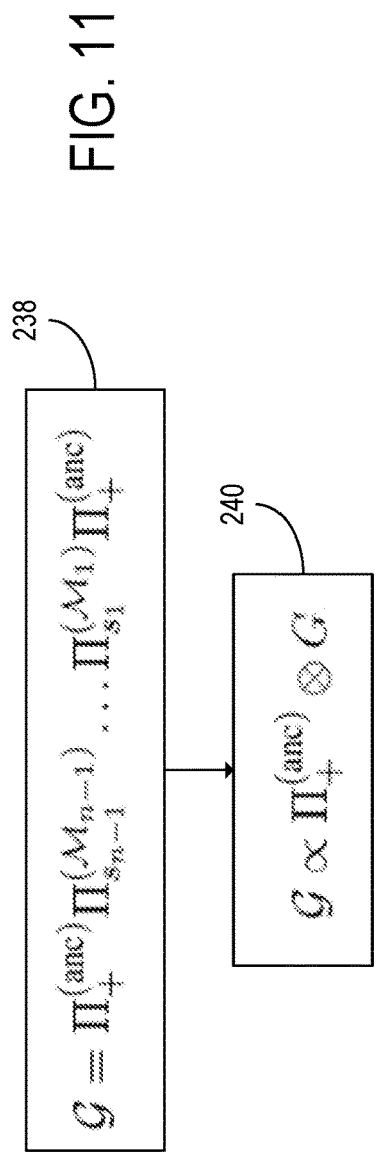
FIG. 11 shows a projector sequence including ancillary projection operators, according to the embodiment of FIG. 1.

The relation between projector sequences and logic gates 40 is many-to-one. A specific sequence of projectors, corresponding to a specific sequence of measurements and outcomes (or forced-measurements), used to generate a gate with a measurement-only protocol may be denoted as shown in equation 238 of FIG. 11. In equation 238, the labels $M_\mu$ are used to denote an allowed set of an even number of MZMs 32 whose joint fermionic parity is projected onto corresponding parity $s_\mu$ at the μth projector in the sequence. The resulting unitary gate G acting on the encoded computational state space is shown in equation 240 of FIG. 11.

Figure 12:
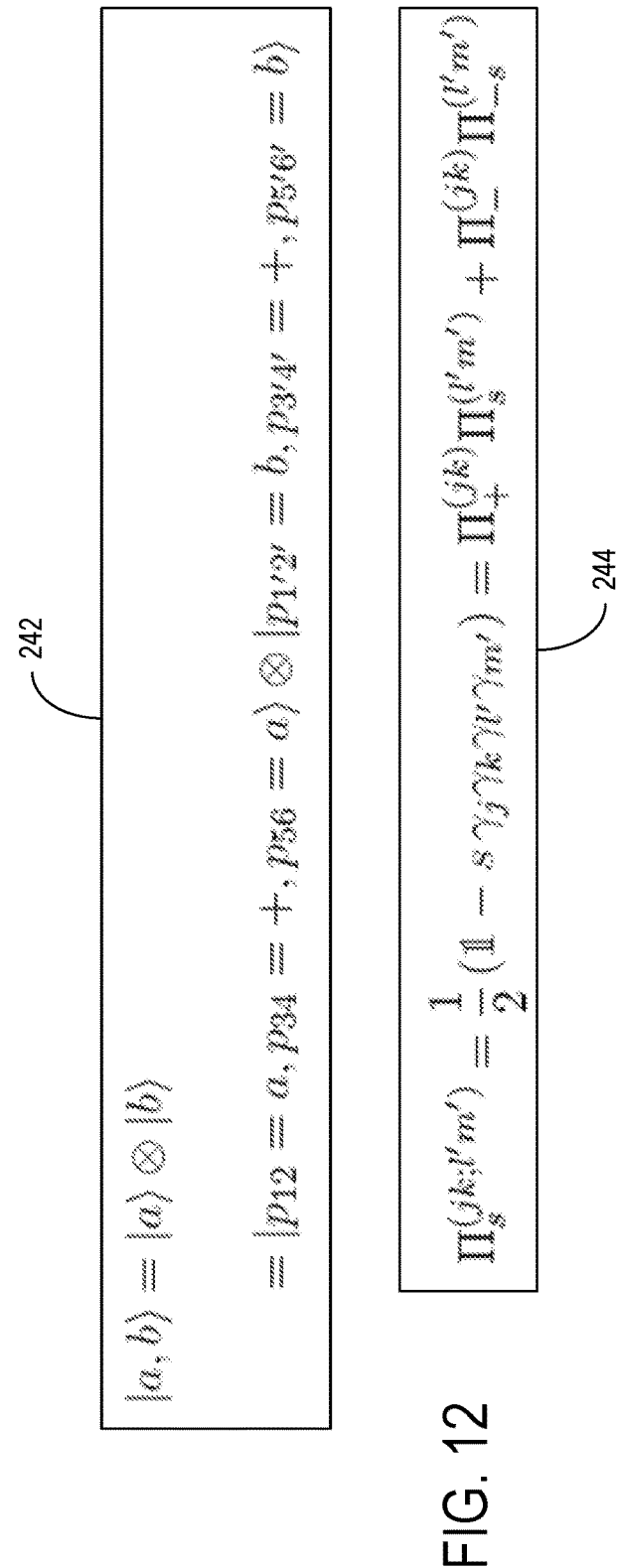
FIG. 12 shows a two-qubit projection operator for four Majorana zero modes of a Majorana hexon, according to the embodiment of FIG. 1.

In embodiments in which the logic gate 40 is constructed from two Majorana hexons 30A and 30B, the Hilbert space of the two Majorana hexons 30A and 30B is the tensor product of that of the two Majorana hexons 30A and 30B. FIG. 12 shows, in equation 242, the quantum state 22 formed by the tensor product of the respective states of the first Majorana hexon 30A and the second Majorana hexon 30B.

In order to generate entangling two-qubit gates, one or more measurements 52 may be made of the collective fermionic parity of four MZMs 32. The 4-MZM joint parity projector is shown in equation 244 of FIG. 12, where the measurement 52 is performed on the MZMs 32 labeled j and k from the first Majorana hexon 30A and the MZMs 32 labeled l' and m' from the second Majorana hexon 30B. Similarly to the 2-MZM joint parity projector shown in equation 200, the 4-MZM joint parity projector of equation 236 does not change the total fermionic parity of either Majorana hexon 30A or 30B.

Equation 246 of FIG. 12 shows an example of a two-qubit entangling gate W. A sequence of projectors that may be measured to obtain the gate W is shown in equation 248. Depending on the outcomes of measuring the projection operators shown in equation 248, either W may be obtained (when $s_1 s_2 s_3 = +1$) or the inverse of W (when $s_1 s_2 s_3 = -1$) may be obtained. The first term in the tensor product acts on the ancillary qubits and the second acts on the computational qubits. Since $\Pi_+^{(3'4')}$ commutes with every operator included in the measurement sequence 50 of equation 248, the final projector only acts on the ancillary pair of MZMs 32. Equation 250 shows an expansion of the sequence of projection operators shown in equation 248. In equation 250, the ancillary projection operator $\Pi_+^{(3'4')}$ is factored out, since it commutes with each of the other projection operators in the measurement sequence 50.

The gate set {S, B, W}, where the single-qubit gates can act on any qubit and the two-qubit gates can act on any nearest-neighbor pair of qubits, may generate any N-qubit Clifford gate $C_N$. For example, the controlled-Z gate may be obtained as $C(Z) = (S^\dagger \otimes S^\dagger)W$, and the controlled not gate may be obtained from C(Z) by conjugating the second qubit by H=SBS. Thus, since {S, B, C(Z)} generates the entire set of N-qubit Clifford gates for any N, the gate set {S, B, W} also does.

As discussed above, some measurements 52 may be more difficult to perform than other measurements 52. These differences in measurement difficulty may include differences in error rates of the measurements 52. Additionally or alternatively, other factors may be used to determine the difficulty of a measurement 52. The error rate of a measurement 52 may be affected by a distance between the MZMs 32 on which the measurement 52 is performed. In some embodiments, the difficulty of a measurement 52 may be lower when the MZMs 32 being measured are closer to each other in the lattice. The processor 12 may be configured to assign respective estimated weighted resource costs 54 to the measurements 52 to account for these differences in difficulty.

In the two-sided Majorana hexon architecture 80 of FIG. 2 and the one-sided Majorana hexon architecture 82 of FIG. 3, measurements 52 are performed by coupling MZMs 32 to quantum dots 78. FIGS. 14A-C show three example fermionic parity measurement configurations 300, 302, and 304. In the examples of FIGS. 14A-C, the couplings between the Majorana hexons 30 and the quantum dots 78 form interference loops delineated by the paths connecting the MZMs 32 through the Majorana hexon 30 and the paths connecting MZMs 32 through the quantum dots 78. To select the interference paths, electrostatic depletion gates are provided such that different parts of the semiconductor may be connected or disconnected. These gates are referred to as cutter gates 76.

Each cutter gate 76 that is opened to form the semiconductor quantum dot configuration may increase the difficulty, as the number of open cutter gates 76 used to realize a quantum dot 78 affects the size of the quantum dot 78. When the number of open cutter gates 76 increases, the coherence of the quantum dot 78 may decrease, thus adding a source of noise to the measurement. In addition, the overall length of the semiconducting path may affect phase coherence, and the volume of the semiconducting region enclosed by the path may affects properties of the quantum dot 78 such as its charging energy and level spacing. Measurements are typically easier to perform for smaller quantum dots 78.

The plurality of cutter gates 76 included in a semiconducting path may include one or more vertical cutter gates 76A. The plurality of cutter gates 76 may further include one or more horizontal cutter gates 76B. In the fermionic parity measurement configuration 302 of FIG. 14A, the semiconducting path includes two vertical cutter gates 76A; in the fermionic parity measurement configuration 304 of FIG. 14B, the semiconducting path includes seven vertical cutter gates 76A; and in the fermionic parity measurement configuration 306 of FIG. 14C, the semiconducting path includes one vertical cutter gate 76A. The length of the semiconducting path may, in some embodiments, be proportional to the number of vertical cutter gates 76A included in the semiconducting path.

Wherever an MZM 32 couples to the semiconductor 74, the coupling may be tuned by a cutter gate 76 forming a tunnel junction 330. In contrast to cutter gates 76 between semiconducting regions, which are typically either fully opened or closed, each tunnel junction 330 may be tuned such that the ratio of the coupling energy of the tunnel junction 330 to the charging energy $E_C$ of the MZM 32 is in a regime in which the effect of the MZM state on the quantum dot 78 is quickly and reliably measurable, while not suppressing the charging energy of the quantum dot 78 or increasing the probability of quasiparticle poisoning. Typically, the visibility of the signal is reduced with each additional tunnel junction 330. Each tunnel junction 330 between an MZM 32 and a quantum dot 78 involved in a measurement 52 has an associated tunneling amplitude. An decrease in the tunneling amplitude may decrease the visibility of the measurement, since decreasing the tunneling amplitude may make the energy splitting between states smaller. This decrease in the visibility of the measurement 52 may increase the measurement time and/or decrease the precision of the measurement 52.

In addition, noise in the tunneling junction 330 may interfere with the measurement signal. As part of the measurement protocol, the coupling between the MZM 32 and the semiconductor 74 may be tuned from zero to its target value on a timescale that is shorter than the timescale of the measurements 52 but slower than a timescale at which diabatic corrections would occur.

The number of tunnel junctions 330 involved in a measurement 52 may be equal to the number of MZMs 32 involved in the measurement 52, since a tunnel junction 330 may be provided for each MZM 32. The fermionic parity measurement configuration 302 of FIG. 14A includes two tunnel junctions 330, the fermionic parity measurement configuration 304 of FIG. 14B includes four tunnel junctions 330, and the fermionic parity measurement configuration 306 of FIG. 14C also includes four tunnel junctions 330.

Fluctuations of the background magnetic field may be another source of noise for the measurement. The contribution of these fluctuations to the noise may be proportional to the area enclosed by the interferometric loop delineated by the architecture of the topological quantum computing device 20 and the geometry of a given measurement 52. In some embodiments, the hexon architecture geometries may be such that the relevant areas for such errors may be approximately partitioned into integer multiples of a unit area 340. In the fermionic parity measurement configuration 302 of FIG. 14A, the semiconducting path has an area of two times the unit area 340; in the fermionic parity measurement configuration 304 of FIG. 14B, the semiconducting path has an area of seven times the unit area 340; and in the fermionic parity measurement configuration 306 of FIG. 14C, the semiconducting path has an area of three times the unit area 340.

The difficulty of a measurement 52 may also depend on the number of Majorana hexons 30 involved in the measurement 52. This is because the measurement visibility may be affected by how precisely the quantum state 22 may be tuned to the degenerate tunneling point. In addition, the operations utilized in a measurement 52 may cause errors that transfer MZMs 32 between the different Majorana hexons 30. Increasing the number of Majorana hexons 30 involved in a measurement 52 may increase the probability of such errors.

Given the factors described above, an estimated weighted resource cost 54 of a 2N-MZM measurement 52 involving N Majorana hexons 30 is shown in FIG. 14A in equation 306. In equation 306, $n_c$ is the number of vertical cutter gates 76 opened for the measurement, $n_a$ is an area enclosed by the interferometry loop delineated by the measurement 52 (expressed as an integer multiple of a unit area), and $n_t$ is the number of tunneling junctions involved in the measurement 52. The quantities $w_c$, $w_a$, and $w_t$ are weighting factors respectively associated with $n_c$, $n_a$, and $n_t$. The weights $w_t$ associated with the tunneling junctions may also include contributions from the horizontal cutter gates 76B, since the horizontal cutter gates 76B may be used to control tunneling. The effect of the number N of Majorana hexons 30 on the estimated weighted resource cost 54 is denoted as f(N). Each of $w_c$, $w_a$, $w_t$, and f(N) may be determined experimentally for the particular topological quantum computing device 20 at which the measurements 52 are performed.

FIGS. 15A-E show example fermionic parity measurement configurations 310, 312, 314, 316, and 318 that may be used with the one-sided Majorana hexon architecture 82 shown in FIG. 3. The fermionic parity measurement configuration 310 of FIG. 15A has three vertical cutter gates 76A, two tunneling junctions 330, and an interference loop enclosing an area of three times the unit area 340. The fermionic parity measurement configuration 312 of FIG. 15B has three vertical cutter gates 76A, four tunneling junctions 330, and an interference loop enclosing an area of five times the unit area 340. The fermionic parity measurement configuration 314 of FIG. 15C has zero vertical cutter gates 76A, four tunneling junctions 330, and an interference loop enclosing an area of two times the unit area 340. The fermionic parity measurement configuration 316 of FIG. 15D has two vertical cutter gates 76A, eight tunneling junctions 330, and an interference loop enclosing an area of six times the unit area 340. The fermionic parity measurement configuration 318 of FIG. 15E has four vertical cutter gates 76A, eight tunneling junctions 330, and an interference loop enclosing an area of four times the unit area 340. The example fermionic parity measurement configurations 312, 314, 316, and 318 of FIGS. 15B-E respectively are configurations of corresponding measurements 52 in an upward direction, a downward direction, a rightward direction, and a leftward direction.

So far, the MZMs 32 in a Majorana hexon 30 have been labeled 1, ..., 6 and have been assigned roles in the measurement 52 according to these labels. For example, in the computational basis, the MZMs 32 labeled as 3 and 4 serve as the ancillary pair, while MZMs 1, 2, 5, and 6 collectively encode the computational qubit. However, the six labels may be assigned to the physical MZMs 32 of a Majorana hexon 30 according to other labeling schemes. The choice of labeling scheme may affect the difficulty of a measurement 52, as discussed below. In some embodiments, the processor 12 may be configured to determine the estimated total resource cost 56 of at least one measurement sequence 50 at least in part by relabeling the MZMs 32 included in the Majorana hexon 30 to change which MZMs 32 are included in the computational qubit and which MZMs 32 are included in the ancillary qubit. In embodiments in which the topological quantum computing device 20 includes one or more Majorana tetrons 130 or Majorana octons, the MZMs 32 included in the Majorana tetrons 130 or Majorana octons may also be relabeled change which MZMs 32 are included in the computational qubit and which MZMs 32 are included in the ancillary qubit.

In the following example, let (a, b, c, d, e, f) denote the configuration of MZMs 32 within a Majorana hexon 30, where for one-sided Majorana hexons, the labeling goes from top to bottom as shown in FIG. 3, and for two-sided Majorana hexons, the labeling goes counterclockwise from the top-left to the top-right as shown in FIG. 2. A possible configuration for either Majorana hexon architecture, as discussed above, is $\langle 1, 2, 3, 4, 5, 6 \rangle$. Here, MZMs 1 and 6 are on opposite ends of the Majorana hexon 30. On the other hand, in the configuration $\langle 1, 6, 2, 3, 4, 5 \rangle$, the MZMs 1 and 6 are adjacent. Thus, different configurations of MZMs 30 will result in different assignments of estimated weighted resource costs 54 to measurements 52. For example, a measurement of MZMs 1 and 6 may have estimated weighted resource costs 54 of $w(16)_{\langle 1,6,2,3,4,5\rangle}$ and $w(16)_{\langle 1,2,3,4,5,6\rangle}$, the latter of which may be higher. If this measurement 52 occurs frequently in a measurement sequence 52, it may be less resource-intensive to use the configuration $\langle 1, 6, 2, 3, 4, 5 \rangle$. In addition, measurements 52 involving pairs that are neighbors in different directions may have different estimated weighted resource costs 54. For example, in a one-sided Majorana hexon architecture 82, measurements 52 connecting vertical neighbors may be less resource-intensive than measurements 52 connecting horizontal neighbors.

The two-sided Majorana hexon architecture 80 and the one-sided Majorana hexon architecture 82 each have symmetry relations that may reduce the number of labeling configurations to evaluate. A two-sided Majorana hexon has horizontal and vertical reflection symmetry, which reduces the number of inequivalent configurations from 6!=720 to 180. One-sided Majorana hexons have vertical reflection symmetry, which reduces the number of inequivalent configurations from 720 to 360.

In order for implementation of the logic gate 40 to be scalable, the full array of Majorana hexons 30 in the topological quantum computing device 20 may utilize labeling configurations that are periodic in the array. In some embodiments, each Majorana hexon 30 in the array may use the same labeling configuration. However, different configurations may be assigned to different Majorana hexons 30 in other embodiments. For example, the array may include a first configuration for all right-facing one-sided Majorana hexons 30 and a second configuration for all left-facing one-sided Majorana hexons 30.

Figure 16A:
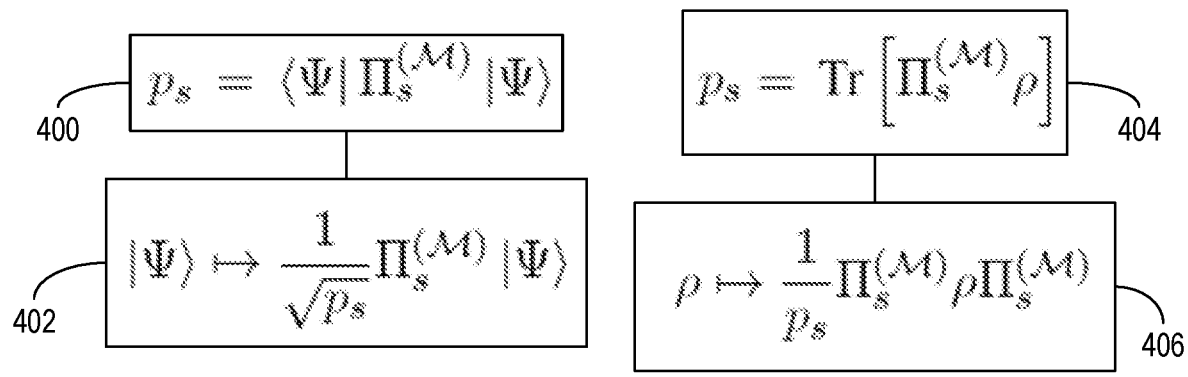
FIG. 16A shows example post-measurement states of a Majorana hexon, according to the embodiment of FIG. 1.

In some embodiments, the topological quantum computing device 20 may be configured to implement the logic gate 40 at least in part by performing a forced measurement of a projection operator 42 included in the logic gate 40. The forced measurement may include performing a first measurement 52 of a joint fermionic parity operator $\Gamma_M$ of the quantum state 22. When the joint fermionic parity operator $\Gamma_M$ of an ordered set of M MZMs 32 is measured in a system in a pure state $|\Psi\rangle$, the measurement outcome s=± may be obtained with the probability shown in equation 400 in FIG. 16A. A post-measurement state shown in equation 402 is obtained when this measurement 52 is made. For general states described by a density matrix ρ, the measurement outcome s may be obtained with the probability shown in equation 404. The post-measurement state for general states described by the density matrix ρ is shown in equation 406.

The forced measurement may further include determining whether a result of the first measurement 52 is a predetermined target value 44. Since the predetermined target value 44 of s is not always obtained when the first measurement 52 is performed, the projection operator 42 with the target parity is not always obtained. In order to obtain the target projection operator $\Pi_s^{(jk)}$ in the measurement-only scheme, a repeat-until-success "forced measurement" procedure may be used. When a measurement of $i\gamma_j\gamma_k$, the joint fermionic parity operator of the target projection operator $\Pi_s^{(jk)}$, is performed, the probability of obtaining the target parity may be ½. The initial measurement 52 of the ancillary pair of MZMs 32 may have a deterministic outcome. When the result of the first measurement 52 of $i\gamma_j\gamma_k$ is not the predetermined target value 44, the forced measurement may further include resetting the quantum state 22 to a state prior to the first measurement 52. The quantum state 22 may be reset by performing a parity measurement on the pair of MZMs measured in a second measurement 52 that was performed prior to the first measurement 52.

Subsequently to resetting the quantum state 22, performing the forced measurement may further include repeating the first measurement 52 of the joint fermionic parity operator $i\gamma_j\gamma_k$. If the repetition of the first measurement 52 also does not return the predetermined target value 44 of the parity, the steps above may be repeated. Thus, the joint fermionic parity operator $i\gamma_j\gamma_k$ may be measured and reset until the measurement 52 returns the predetermined target value 44.

Figure 16B:
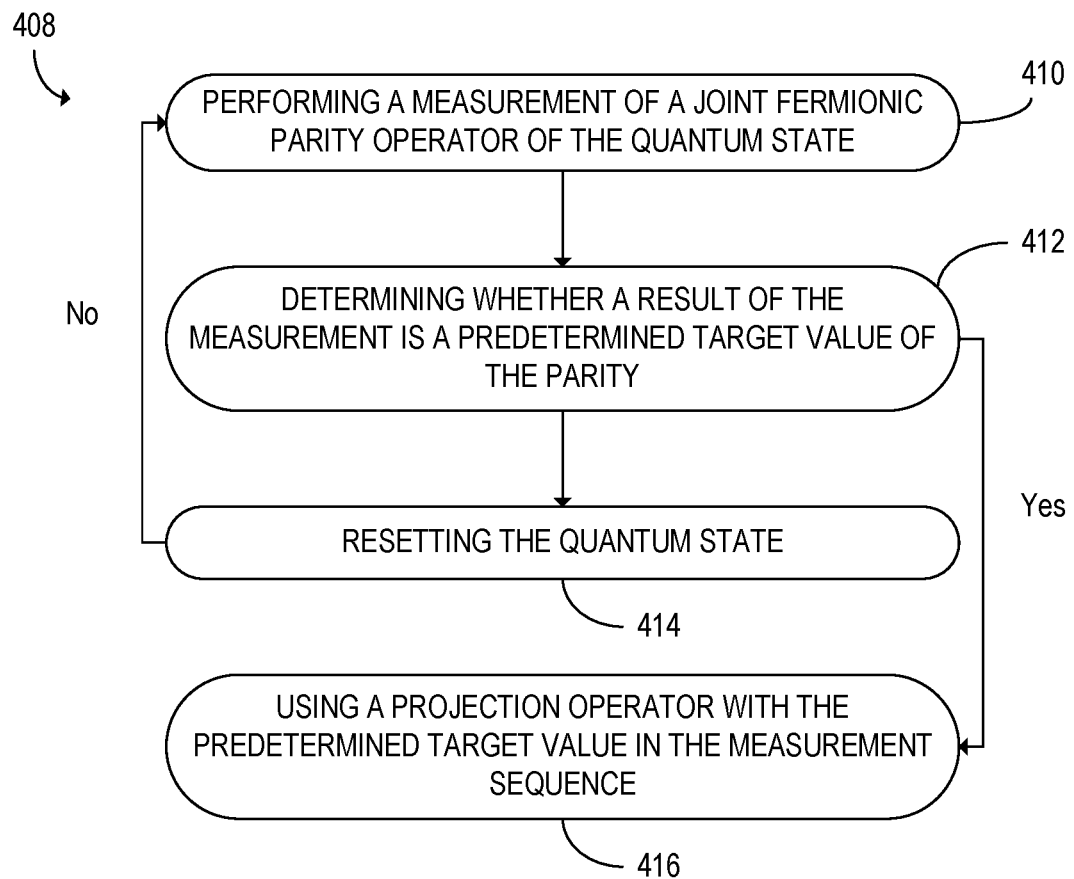
FIG. 16B shows a method for performing a forced measurement of a projection operator, according to the embodiment of FIG. 1.

FIG. 16B shows a flowchart of an example method 408 by which the forced measurement may be performed. At step 410, the method 408 may include performing a measurement 52 of a joint fermionic parity operator of the quantum state. At step 412, the method 408 may further include determining whether a result of the measurement 52 is a predetermined target value 44 of the parity. If the result of the measurement is not the predetermined target value 44, the method 408 may include, at step 414, resetting the quantum state 22. The method 408 may then return to step 410. If the result of the measurement 52 is the predetermined target value 44, the method 408 may further include, at step 416, using a projection operator with the predetermined target value 44 in the measurement sequence 50.

An example in which forced measurement is used to obtain a measurement sequence 50 is shown in FIGS. 17A-C. In the example of FIGS. 17A-C, the S gate is generated with the projection operator sequence $\Pi_+^{(34)}\Pi_+^{(23)}\Pi_+^{(13)}$. A diagram 418 for this projector sequence is shown in FIG. 17A. In the example of FIGS. 17A-C, the measurement of $i\gamma_1\gamma_3$ results in the target value 44 of $s_1$=+, but the measurement of $i\gamma_2\gamma_3$ results in the undesired value of $s_2$=−, as shown in diagram 420 in FIG. 17B. As shown in diagram 422 of FIG. 17C, the measurement of $i\gamma_1\gamma_3$ may be repeated. The quantum state 22 is reset regardless of the outcome of this repeated measurement. The measurement of $i\gamma_2\gamma_3$ may then be repeated, with another ½ probability of obtaining the predetermined target result $s_2$=−. If the undesired measurement outcome is obtained again, the above steps may be repeated until the predetermined target outcome is obtained. The measurement sequence 50 depicted in diagram 422 differs only by an overall phase from the measurement sequence 50 depicted in diagram 424, as indicated in equation 426.

In order to distinguish the application of a forced-measurement operation from the projectors associated with a physical measurement, the application of this forced-measurement to the MZM pair (jk) in a sequence following a measurement of (kl) is denoted in equation 428 of FIG. 18. In equation 428, the desired measurement outcome s is obtained at the nth attempt. In addition, $s_a \neq s$ for $a=1, \ldots, n-1$, and the measurement outcomes $r_a$ are irrelevant.

The estimated total resource cost 56 of the forced measurement sequence of equation 428 may be given by equation 430 in some embodiments. The estimated total resource cost 56 provided in equation 430 is equal to the estimated total resource cost 56 of an average-case measurement sequence 50 including $\langle n \rangle = 2$ attempts.

As an alternative to the forced measurement procedure discussed above, the following procedure may be used to obtain the predetermined target value 44 of a measurement 52. When the measurement 52 of the MZM pair (jk) following a measurement 52 of the MZM pair (kl) yields an undesired outcome, instead of resetting the quantum state 22 by repeating the previous measurement 52 of (kl), the quantum state 22 may instead be reset by measuring the MZM pair (jl). Thus, resetting the quantum state 22 may include, in the alternative forced measurement protocol, measuring an MZM pair including a first MZM 30 (labeled above as j) on which the first measurement 52 was performed. The MZM pair further includes a second MZM 30 (labeled above as l) on which a second measurement 52 that was performed prior to the first measurement 52 in the measurement sequence 50 was performed. However, unlike in the first forced measurement protocol discussed above, the second measurement 52 was not performed on the first MZM 30 in the MZM pair.

In more general terms not specific to topological quantum computing devices 20 that include MZMs 32, resetting the quantum state 22 according to the alternative forced measurement protocol includes measuring a plurality of topological charges. The plurality of topological charges including a symmetric difference of a first plurality of topological charges on which the first measurement 52 was performed and a second plurality of topological charges on which a second measurement 52 was performed prior to the first measurement 52 in the measurement sequence 50. "Symmetric difference" is defined as the union of two sets minus the intersection of the two sets.

The alternative forced measurement approach is shown diagrammatically in FIGS. 19A-B for the projector sequence $\Pi_+^{(34)} \Pi_+^{(36)} \Pi_+^{(23)} \Pi_+^{(13)}$, when an undesired measurement outcome occurs for the measurement of MZMs (36). FIG. 19A shows, at diagram 432, the projector sequence after the undesired measurement outcome $s_3 = -$ has occurred. FIG. 19A further shows a first forced measurement sequence in diagram 434. FIG. 19B shows, in diagram 436, a second forced measurement sequence that may be used as an alternative to that of FIG. 19A. In addition, as shown in equation 438 in FIG. 19B, the projector sequence shown in diagram 436 differs only by an overall constant from the projector sequence $\Pi_+^{(34)} \Pi_+^{(36)} \Pi_+^{(23)} \Pi_+^{(13)}$.

In order to differentiate the alternative forced-measurement protocol from the first forced measurement protocol (and from an ordinary projector), this alternative forced measurement protocol as applied to the MZM pair (jk) following a measurement 52 of the MZM pair (kl) is defined in equation 440 of FIG. 20. In equation 440, $s_a \neq s$ for $a=1, \ldots, n-1$, and the measurement outcomes $p_a$ are irrelevant. As in the first forced measurement protocol discussed above, the estimated total resource cost 56 of the forced measurement sequence of equation 440 may be the geometric mean of the weighted estimated resource costs 54 of the measurements 52 in the measurement sequence 50. This estimated total resource cost 56 may be equal to the difficulty weight of the average-case measurement sequence 50 including $\langle n \rangle = 2$ attempts. The estimated total resource cost 56 in such embodiments is given in equation 442 of FIG. 20. This alternative forced measurement protocol may be less resource intensive than the first forced measurement protocol in embodiments where parity measurements of MZMs (jl) have lower weighted estimated resource costs 54 than measurements of MZMs (kl).

Forced measurement protocols for 2N-MZM measurements, in particular 4-MZM measurements, are discussed below with reference to FIGS. 21-22. These forced measurement protocols may also be used for 2-MZM measurements that follow a 4-MZM measurement. Equation 444 of FIG. 21 shows the condition under which a forced measurement of $M_2$ follows a measurement of $M_1$ for some choice of $M_3$. As another condition for performing the forced measurement on $M_2$, the subsequent projection operators in the measurement sequence 50 may not commute with each other. This condition holds when $\Gamma_{M_1} \Gamma_{M_2} = -\Gamma_{M_2} \Gamma_{M_1}$ and $\Gamma_{M_2} \Gamma_{M_3} = -\Gamma_{M_3} \Gamma_{M_2}$.

Another form of the left-hand side of equation 444 is shown in equation 446 of FIG. 21. Equation 448 further shows the conditions under which equation 444 holds. Under the conditions given in equation 448, $\Gamma_{M_3}$ may be replaced with a constant. FIG. 21 provides a generalization of the two different forced measurement protocols described above. The second condition shown in equation 448 may lead to invalid measurement sequences that would collapse the qubit states or to measurements of greater than 2N-MZMs if $M_1$ and $M_2$ include more than two elements each. Since the estimated total resource cost 56 grows quickly as the number of MZMs 32 increases, it is preferable to avoid having to measure such sequences. However, the above problems do not arise when the first condition of equation 448 is satisfied.

Figure 22:
FIG. 22 shows the estimated total resource costs of measurement sequences including forced measurements of four Majorana zero modes of a Majorana hexon, according to the embodiment of FIG. 21.

Equation 450 of FIG. 22 shows four example forced measurement protocols for measurement sequences 50 involving four MZMs 32. In addition, equation 452 shows the respective estimated total resource costs 56 of the measurement sequences 50 of equation 450, according to one embodiment.

The forced measurement protocols discussed above provides control over which fermionic parities are projected upon at each measurement 52 in the measurement sequence 50. These forced measurement protocols allow for the implementation of a projector sequence that generates a specified target logic gate 40. A forced measurement protocol could be applied for every projector in a given projector sequence. However, such a strategy may be inefficient, since the different projectors in the measurement sequence 50 may have a correlated effect on the resulting logic gate 40. When determining the estimated total resource cost 56 for a measurement sequence, the processor 12 may be further configured to determine which projectors in a measurement sequence 50 have a correlated effect and, therefore, which specific measurements 52 can tolerate any outcome and which measurements 52 may have to be forced in order to obtain the logic gate 40. In such embodiments, the processor 12 may be configured to determine the respective estimated total resource cost 56 of each measurement sequence 50 at least in part by identifying one or more measurement sequences 50 that differ by an overall Pauli operator, as discussed in further detail below.

Figure 5:
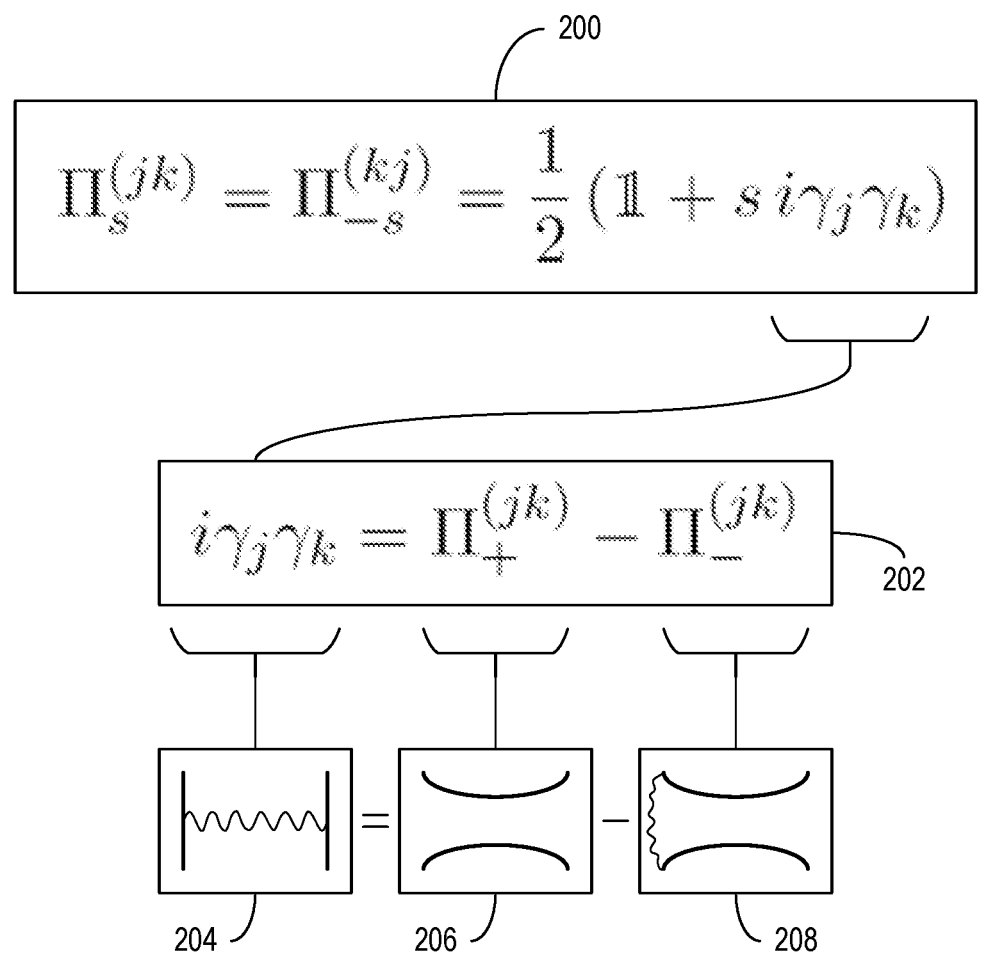
FIG. 5 shows projection operators for a Majorana hexon, according to the embodiment of FIG. 1.

Returning to FIG. 6, equation 212 shows the joint fermionic parity operators $i\gamma_j\gamma_k$ expressed in terms of the Pauli operators shown in equation 214. In addition, as shown in FIG. 5, a projection operator $\Pi_s^{(jk)}$ may be drawn as a cap and cup, connected by a wavy line if $s=-$ and unconnected if $s=+$. For every $s=-$ projector in the measurement sequence, the corresponding fermion line (that terminates on two MZM lines) may be moved to the top of the diagram using the diagrammatic rules. Each such fermion line that has been slid to the top of the diagram simply connects two MZM lines j and k, resulting in a joint fermionic parity operator $i\gamma_j\gamma_k$. In embodiments in which every measurement sequence starts and ends with a forced measurement of $\pi_+^{(anc)}$, the fermion lines do not connect to the ancillary MZM lines when pushed to the top of the diagram. Thus, in such embodiments, j and k do not correspond to ancillary MZMs 32.

Figure 23:
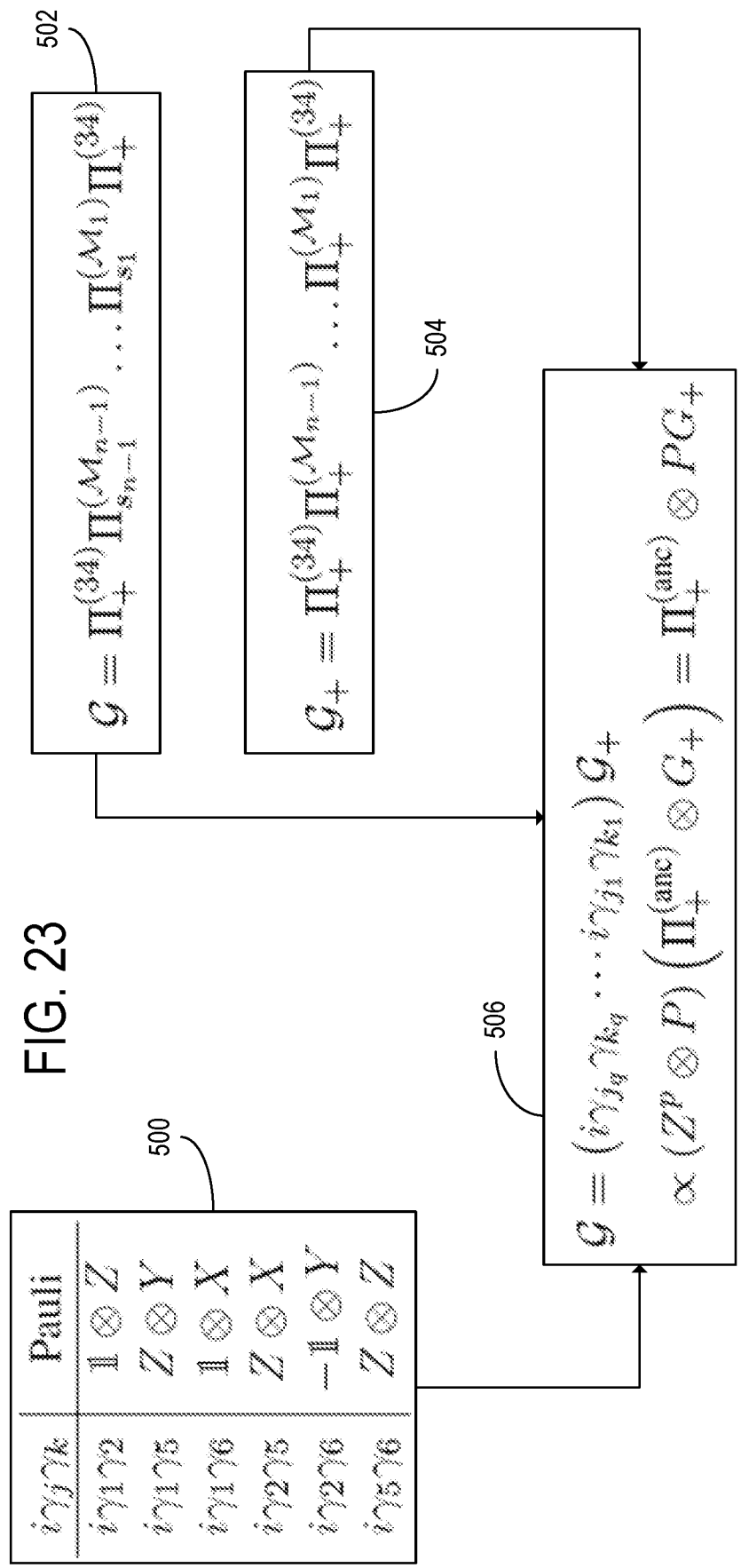
FIG. 23 shows joint fermionic parity operators expressed in terms of Pauli operators, according to the embodiment of FIG. 1.

Turning now to FIG. 23, the fermion lines that are slid to the top of the diagram correspond to the Pauli operators shown in table 500. The complete operation effected on the computational subspace by a measurement sequence 50 may be a braiding transformation (hence a Clifford gate) determined by which MZMs 32 are measured in the measurement sequence 50, followed by a Pauli gate determined by the measurement outcomes. Equation 502 of FIG. 23 shows a single-hexon projector sequence that compiles to a Clifford gate G. In equation 502, the projection channel parities $s_\mu$ need not all be positive. Equation 504 shows the single-hexon projector sequence of equation 502 when respective parities of all the projection operators have been set to positive. Equation 502 may be rewritten as equation 506, where q is the number of projection operators with negative parities in equation 502, p is an integer, and P is a Pauli gate. Thus, the effect of the measurement outcomes $s_\mu$ in a single-hexon projector sequence is to change the resulting logic gate 40 by at most a Pauli gate.

Figure 24A:
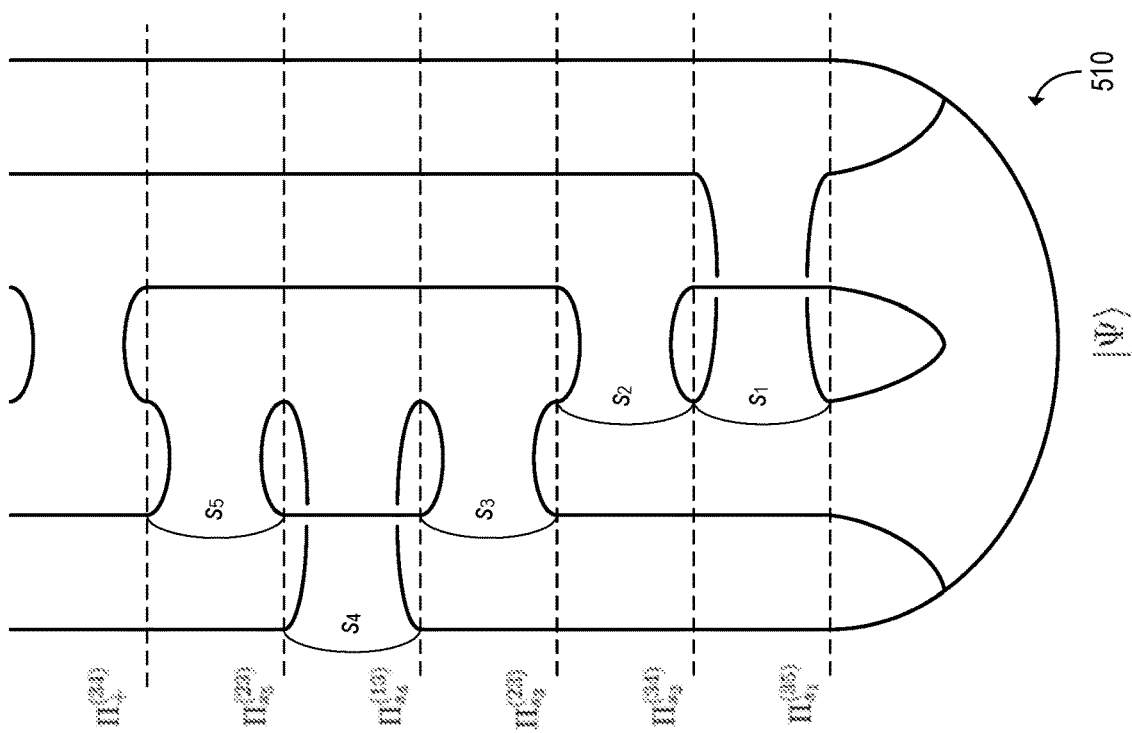

FIG. 24A shows, in equation 508, a projection operator sequence that may be used to implement any of the Pauli gates. In equation 508, the resulting Pauli gate P is independent of $s_1$ and $s_4$. This independence is shown in FIGS. 24A-B with the diagram 510, which differs only by overall phases from the diagrams 512 and 514 of FIG. 24B. Isotopy of the MZM lines allows them to be straightened, leaving no nontrivial braiding in diagram 514. Thus, $P_+=1$, where $P_+$ is the Pauli gate that results when all measurement outcomes $s_\mu=+$ in equation 508. In addition, in FIGS. 24A-B, both ends of the $s_1$ line connect to the j=5 MZM line when straightened and both ends of the $s_4$ line connect to the j=1 MZM line when straightened, which allows the $s_1$ and $s_4$ lines to be removed without affecting the resulting logic gate 40. After straightening the MZM lines and sliding the $s_\mu$ lines to the top of the diagram, $s_2=-$ contributes the operator $i\gamma_2\gamma_5=Z\otimes X$, $s_3=-$ contributes the operator $i\gamma_1\gamma_2=1\otimes X$, and $s_5=-$ contributes the operator $i\gamma_1\gamma_2=1\otimes Z$. Thus, the compiled Pauli gate is P as shown in equation 508.

For multi-hexon projector sequences, changing the projection channel parities $s_\mu$ also changes the resulting logic gate 40 by at most a multi-qubit Pauli gate. In addition, by tracking the effects of the projection channel parities $s_\mu$ on the resulting compiled gate, the processor 12 may be configured to determine one or more measurements 52 in the measurement sequence 50 for which to perform forced measurements. For a single-hexon projector sequence, when all the fermion lines in the projector sequence are moved to the top of the diagram, each line may either be removed or may end up in one of the six configurations connecting MZM lines represented by the fermion parity operators $i\gamma_j\gamma_k$ listed in table 500. In this way, the specific Pauli operator contributed by a given measurement outcome to P in the decomposition shown in equation 506 may be determined. Therefore, any Clifford gate may be generated from a measurement sequence 50 in which three or fewer of the measurements 52 in the measurement sequence 50 are forced measurements. Of these three or fewer forced measurements, one forced measurement may be used to assign a positive parity to the ancillary pair of MZMs 32, and the other two or fewer forced measurements may be used to obtain a target Pauli gate. For example, the measurement sequence 50 of FIGS. 24A-B may generate a particular target Pauli gate for any values of $s_1$, $s_3$, and $s_4$ by choosing $s_2$ and $s_5$ appropriately via forced measurements.

Another approach that may be used in addition to, or as an alternative to, forced measurement in measurement-only topological quantum computing is described below. In this approach, known as Majorana-Pauli tracking, measurement outcomes that only change the resulting braiding transformations by Pauli gates may be tracked. More generally, a similar tracking strategy may be employed when the measurement outcomes are Abelian anyons. Majorana-Pauli tracking may allow for the use of fewer physical measurement operations and may allow deterministic measurement sequences 50 to be used for topological gate operations.

Figure 25:
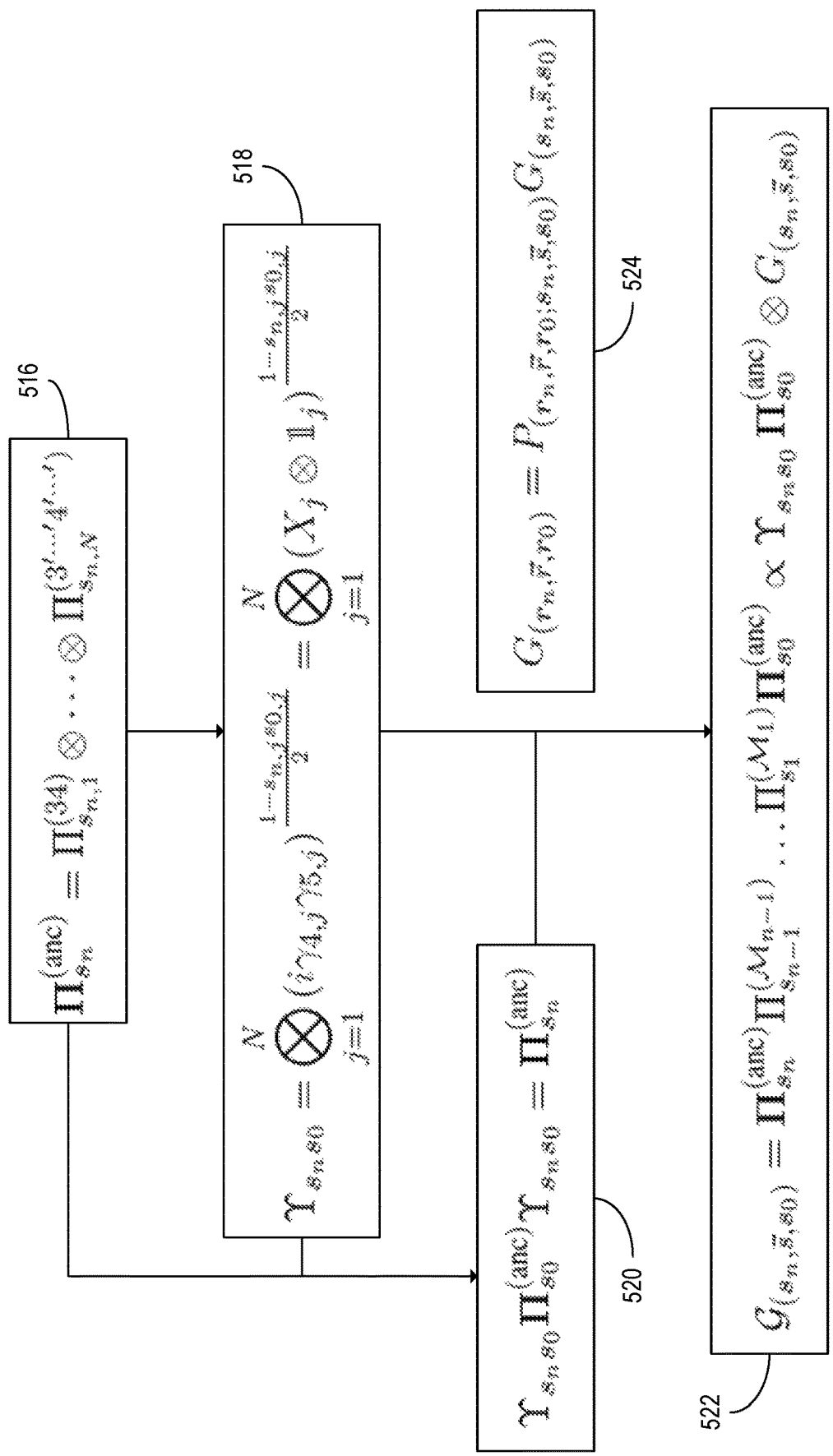
FIG. 25 shows the construction of a measurement sequence that compiles to a logic gate for a plurality of Majorana hexons, according to the embodiment of FIG. 1.

FIG. 25 shows the construction of a measurement sequence 50 that compiles to a gate G acting on the computational state space in a system of N Majorana hexons 32. First, in equation 516, an ancillary projection operator 516 is defined for the N-hexon system. In addition, equation 518 introduces a reversal operator that flips the state of each ancillary qubit whose initial and final projections differ. In equation 518, $\gamma_{a,j}$ is the ath MZM 32 of the jth Majorana hexon 30. In equation 520, the ancillary projection operator of equation 516 is expressed in terms of the reversal operator of equation 518. Equation 522 provides the measurement sequence 522 by which the gate G is compiled according to the Majorana-Pauli tracking protocol, in terms of the operators defined in equations 516, 518, and 520. The operator G shown in equation 522 is a unitary operator and therefore does not reduce the rank of the computational subspace.

When Majorana-Pauli tracking is used, instead of the convention $p_{34}=+1$ used with the forced measurement protocol, $p_{34}$ may take either a positive or negative value. The value of $p_{34}$ may change over the course of generating a measurement-only gate. As in the forced measurement protocol, the computational qubit is encoded in $p_{12}$. Thus, when the collective fermionic parity of the Majorana hexon 30 is even, the remaining parity $p_{56}$ is determined by the respective parities of the other two pairs according to $p_{56}=p_{12}p_{34}$. For the general case in which the Majorana hexon 30 may have a collective fermionic parity $p_h$ that may be even or odd, the parity $p_{56}$ is given by $p_{56}=p_{12}p_{34}p_h$.

As shown in equation 524, an N-qubit Pauli operator may be applied to the gate G of equation 522 to produce the same gate with a different sequence of projections. Thus, if a measurement-only sequence of measurements 52 is performed to obtain a logic gate 40 and the measurement outcomes are tracked, the resulting logic gate 40 will have a known Pauli gate correction. If the non-Clifford gates that are utilized in a quantum computation are single-qubit phase gates (in any of the Pauli bases), the Pauli gate correction may be pushed through the phase gates with at most a Clifford gate correction. When a Clifford gate correction is performed, a Clifford gate by which the logic gate 40 differs from the target logic gate may be tracked as the measurement sequence 50 is performed. In such embodiments, the Clifford gate correction may be dealt with by updating the subsequent Clifford gate in the computation. When non-Clifford phase gates are implemented by injecting states, such a Clifford correction would typically be used. Thus, the effect of the Clifford correction on performance would be small.

Approaches are discussed below by which the processor 12 may be further configured to determine a first measurement sequence 60 that has a lowest estimated total resource cost 66 of the plurality of measurement sequences 50. The lowest estimated total resource cost 66 may be a global minimum estimated total resource cost 66 across all measurement sequences 50 that implement the logic gate 40 or may alternatively be a minimum estimated total resource cost of a subset of all such measurement sequences 50 that are searched by the processor 12.

When a topological quantum computation is performed using a plurality of different logic gates 40, the processor 12 may be configured to select the lowest estimated total resource cost 66 for a subset of the plurality of different logic gates 40. Within a given topological quantum computation, it is not always possible for all logic gates 40 involved in the computation to be implemented with their respective first measurement sequences 60. In some embodiments, the first measurement sequence 60 may be used for one or more logic gates 40 that are used with a high frequency in the topological quantum computation. For example, the one or more logic gates 40 for which the first measurement sequence 60 is determined may be the controlled-Pauli gates, the Hadamard gate, or all single-qubit Clifford gates.

When the processor 12 searches for the first measurement sequence 60, the processor 12 may perform the search over measurement sequences 50 used in the Majorana-Pauli tracking protocol or the forced measurement protocol. Determination of the first measurement sequence 60 having the lowest estimated total resource cost 66 is first discussed herein for the Majorana-Pauli tracking protocol. When a measurement sequence 50 is compiled in terms of the projector sequence shown in equation 522, the sequence of physical measurements that will be performed is the sequence $M_1, \ldots, M_n$ specified in the projector sequence. When the physical measurement outcomes do not match the specified projector channels $s_\mu$, the resulting gate differs from G by at most a Pauli gate, which may be tracked and compensated for at a later time. As such, this measurement-only realization of G may be assigned the estimated total resource cost 56 shown in equation 526 of FIG. 26.

When Majorana-Pauli tracking is utilized, Clifford gates may be grouped into Pauli cosets given by collections of Clifford gates that are equivalent up to multiplication by an overall multi-qubit Pauli gate. The Pauli coset of an N-qubit Clifford gate G is defined in equation 528 of FIG. 26. When using Majorana-Pauli tracking, it is not necessary to generate every Clifford gate. Instead, one Clifford gate from each Pauli coset may be generated, since differences by Pauli gates are dealt with by the tracking protocol. Thus, in some embodiments, the most easily realized Clifford gate in a given Pauli coset may be used to implement the entire class of Clifford gates. Thus, the element of each Pauli coset with the lowest estimated total resource cost 66 may be used when any Clifford gate in that Pauli coset is called in a computation.

When a forced measurement protocol is utilized instead, the measurement sequence 50 for compiling a gate G may be written as shown in equation 530 of FIG. 27. When determining the first measurement sequence 60 with the lowest estimated total resource cost 66, the processor 12 may be configured to determine the minimum number of projectors for which forced measurement is needed to generate the gate G with the forced measurement protocol. The projector sequence may then be converted into a measurement sequence 50 by utilizing forced measurement for each projector where forced measurement is needed. Standard measurements may be performed for the other projectors. For each projector for which forced measurement is performed, the forced measurement protocol that is used, of the two forced measurement protocols discussed above, may be the forced measurement protocol for which the estimated weighted resource cost 54 of the forced measurement is lower.

The estimated total resource cost 56 of a measurement sequence 50 when a forced measurement protocol is used may be determined by taking the geometric mean of the possible total resource costs of the measurement sequence 50. As shown in equation 532 of FIG. 27, this geometric mean may be obtained by starting with the expression from equation 430 for the difficulty weight of the projector sequence and replacing the weights of the projectors that are forced with the average difficulty weight corresponding to the forced-measurement protocol used. In equation 532, $F_1$ is the set of projectors in the sequence to be implemented by forced measurements of the first type and $F_2$ is the set of projectors in the sequence to be implemented by forced measurements of the second type.

When searching for measurement sequences 50 that may be used to implement a logic gate 40, the processor 12 may be configured to determine what measurement sequences 50 do not collapse the computational state. For single-qubit gates, such measurement sequences 50 may satisfy the condition that consecutive 2-MZM measurements must have exactly one MZM 32 in common. Under such a condition, each measurement step may involve choosing one MZM 32 from the previous measurement pair and one from the four remaining MZMs 32, leading to eight possible measurements 52 to choose from. The nth measurement 52 in the measurement sequence 50 may be constrained to be a measurement of the ancillary pair (3, 4) of MZMs 32. In addition, the second-to-last measurement 52 may be constrained to involve one MZM 32 of the preceding pair and one MZM 32 of the ancillary pair. Thus, there may be four choices available for the second-to-last measurement 52. The size of the search space for single-hexon measurement sequences of length n may be $2^{3n-4}$. Even though this scaling is exponential in n, the value of n in the first measurement sequence 60 with the lowest estimated total resource cost 66 is typically low for single-qubit gates.

Once the one or more measurement sequences 50 that produce a target logic gate 40 without collapsing the computational state are determined, the resulting logic gates G may be evaluated for all possible measurement outcomes $s_\mu$. In some embodiments, the processor 12 may be configured to perform a brute-force search by determining a respective estimated total resource cost 54 for each measurement sequence 50 that implements a target logic gate 40 and is shorter than a predetermined length 58. For example, the predetermined length 58 may be n=9.

The example provided below discusses determination of the first measurement sequence 60 and the lowest estimated total resource cost 66 for the set of controlled Pauli gates {C(X), C(Y), C(Z)} and the SWAP gate, which are examples of two-qubit Clifford gates. A quantum state 22 of two Majorana hexons 30 has 510 different nontrivial fermionic parity projectors. In some embodiments, each of the nontrivial fermionic parity projectors may be tested at each measurement step to determine which projectors do not collapse the computational state. In such embodiments, the processor 12 may be configured to diagonalize the projector sequence after each time a projector is added. When the projector sequence has been diagonalized, the processor 12 may be further configured to discard the projector sequence if the projector sequence collapses the computational state. However, performing the diagonalization of the projector sequence may be computationally costly.

As an alternative, for small values of n, each of the 510 possible parity projectors may be applied at each step in the projector sequence. The final resulting logic gates 40 generated by the projector sequences may then be checked. In the example in which the respective first measurement sequences 60 are determined for each of the controlled Pauli gates, projector sequences that produce the controlled Pauli gates may include at least four projectors. In this example, a search of each measurement sequence 50 up to the predetermined length 58 of n=4 may be performed.

Additionally or alternatively, each possible projector sequence, up to some predetermined length 58, that includes one 4-MZM projector may be searched for the controlled Pauli gates. For example, the predetermined length 58 may be n=5.

Each projector sequence that compiles to the SWAP gate includes at least two 4-MZM projectors. A search for the two 4-MZM projectors may be performed for projector sequences up to the predetermined length 58 of n=4. For the one-sided Majorana hexon architecture 82, no projector sequences that compile to the SWAP gate are found for this predetermined length 58. Instead, a projector sequence that compiles to the SWAP gate may be formed from a plurality of controlled not gates.

For a two-qubit measurement sequence 50 that compiles to a target logic gate 40, the measurement sequence 50 may be evaluated for each possible projector channel $s_\mu$. Evaluating each measurement sequence 50 for each possible projector channel $s_\mu$ may provide the Pauli correction gate that may be used in the Majorana-Pauli tracking protocol and may also identify the projectors for which forced measurement is performed in the forced measurement protocol.

Correlations between the remaining measurement outcomes may then be identified. Such correlations may be determined starting with the first projector that does not have fixed projection channel, denoted as $s_\nu$. The subsets of projector sequences where $s_\nu=+1$ and where $s_\nu=-1$ may be considered separately. Within each subset, the processor 12 may be configured to check whether any subsequent measurement 50 has a fixed outcome. If a subsequent measurement 50 has a fixed outcome, that measurement 50 may be forced onto a channel that is correlated with $s_\nu$. If the measurement 50 does not have a fixed outcome, the above steps may be recursively applied with the projection channel of that measurement replacing $s_\nu$.

In one example of compiling a two-qubit gate from a measurement sequence 50, the sequence $\Pi_+^{(34)} \Pi_{s_3}^{(35)} \Pi_{s_2}^{(56)} \Pi_{s_1}^{(35;\ 1'6')}$ complies to a controlled not gate when $s_2=+$ and $s_3=s_1$. Thus, the projector sequences $\Pi_+^{(34)} \Pi_+^{(35)} \Pi_+^{(56)} \Pi_+^{(35;\ 1'6')}$ and $\Pi_+^{(34)} \Pi_-^{(35)} \Pi_+^{(56)} \Pi_-^{(35;\ 1'6')}$ yield the same logic gate 40. In this example, forced measurement may be performed for $\mu=2, 3, 4$.

In one example of identifying the first measurement sequence 60, the example weighting factors $w_c=1.25$, $w_a=1.01$, $w_t=1.65$, and $f(N)=(N!)^{N-1}$ may be used in equation 306. In this example, when either forced measurement or Majorana-Pauli tracking is used with a two-sided Majorana hexon architecture 80, the MZM labeling configuration ⟨3, 4, 1, 2, 6, 5⟩ yields the lowest estimated total resource cost 66 for each of the single-qubit Hadamard gate, the geometric mean of all single-qubit Clifford gates, the geometric mean of controlled not gates acting in all four directions, and the geometric mean of controlled Pauli gates acting in all four directions. For one-sided Majorana hexon architectures 82, when forced measurement is used, the MZM labeling configuration ⟨1, 2, 6, 3, 4, 5⟩ yields the lowest estimated total resource cost 66 for the Hadamard gate and the geometric mean of all single-qubit Clifford gates, and the MZM labeling configuration ⟨3, 4, 1, 2, 6, 5⟩ yields the lowest estimated total resource cost 66 for the geometric mean of controlled not gates acting in all four directions and the geometric mean of controlled Pauli gates acting in all four directions. For one-sided Majorana hexon architectures 82, when Majorana-Pauli tracking is used, the MZM labeling configuration ⟨1, 2, 6, 3, 4, 5⟩ yields the lowest estimated total resource cost 66 for each of the single-qubit Hadamard gate, the geometric mean of all single-qubit Clifford gates, the geometric mean of controlled not gates acting in all four directions, and the geometric mean of controlled Pauli gates acting in all four directions.

Figure 28:
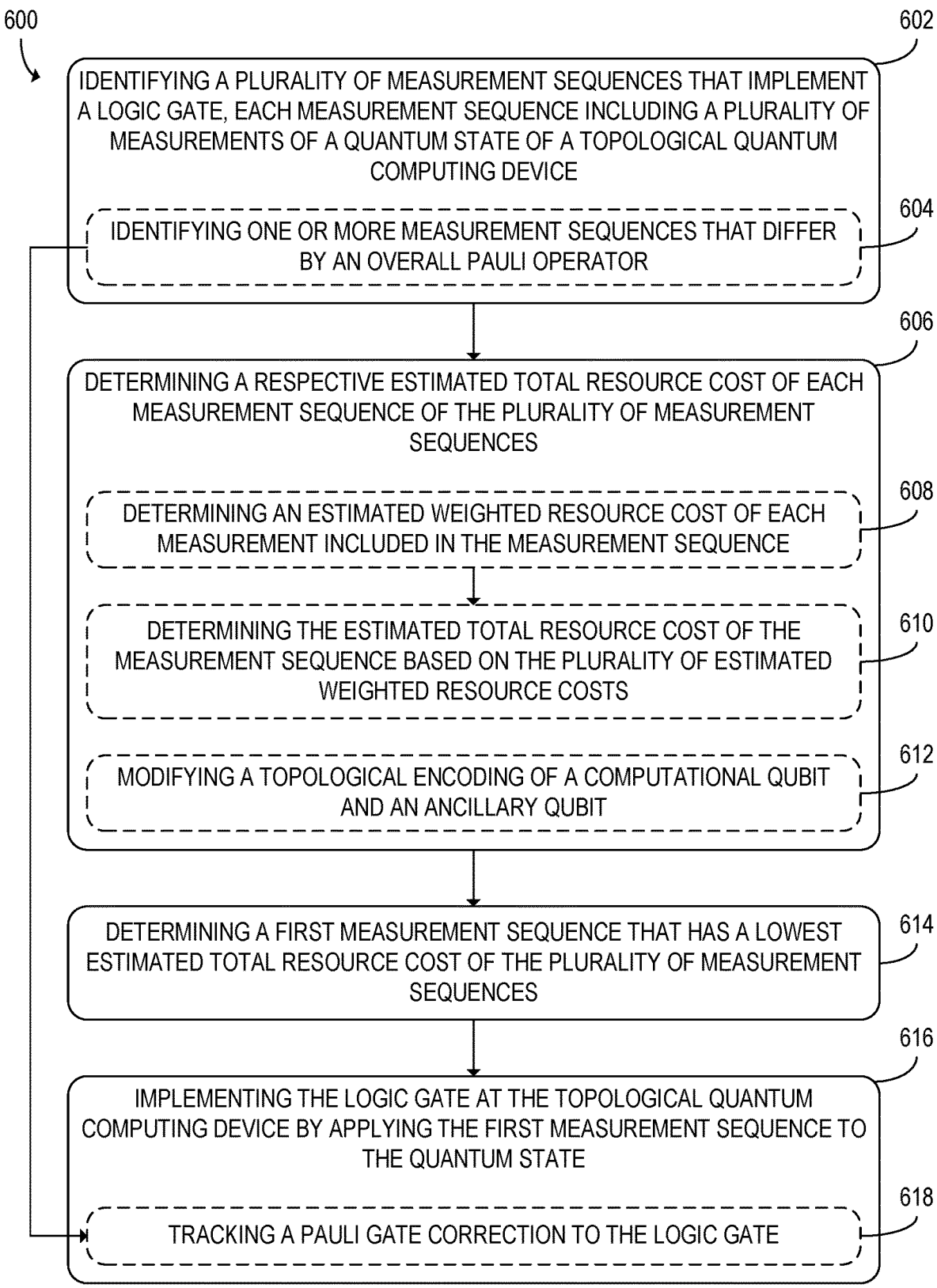
FIG. 28 shows a flowchart of an example method that may be used for performing a quantum computation by implementing a logic gate, according to the embodiment of FIG. 1.

FIG. 28 shows a flowchart of an example method 600 for performing a quantum computation by implementing a logic gate. The method 600 may be used with the quantum computing system 10 of FIG. 1, the example quantum computing system 100 of FIG. 4, or some other quantum computing system. At step 602, the method 600 may include identifying a plurality of measurement sequences that implement a logic gate. Each measurement sequence may include a plurality of measurements of a quantum state of a topological quantum computing device. In some embodiments, the topological quantum computing device may include at least one of a Majorana tetron including four MZMs, a Majorana hexon including six MZMs, or a Majorana octon including eight MZMs. The topological quantum computing device may include a plurality of Majorana tetrons, hexons, and/or octons in some embodiments. Additionally or alternatively, the topological quantum computing device may include a Majorana tetron including four MZMs and/or a Majorana octon including eight MZMs. A measurement sequence may include measurements of a plurality of Majorana tetrons, hexons, and/or octons in some embodiments.

In some embodiments, step 602 may include, at step 604, identifying one or more measurement sequences that implement the logic gate multiplied by an overall Pauli operator. When two measurement sequences differ by an overall Pauli operator, the Pauli operator may be tracked as the measurements in the measurement sequence are performed when the topological quantum computing device implements the logic gate. A correction for the overall Pauli operator may be performed at the end of the measurement sequence. Step 604 may allow computational resources to be saved by reducing the number of measurement sequences that are checked by more computationally intensive methods.

At step 606, the method 600 may further include determining a respective estimated total resource cost of each measurement sequence of the plurality of measurement sequences. For each measurement sequence of the plurality of measurement sequences, step 606 may include, at step 608, determining an estimated weighted resource cost of each measurement included in the measurement sequence. In some embodiments, the estimated weighted resource cost of each measurement may indicate an error rate of the measurement. In embodiments in which step 608 is performed, step 606 may further include, at step 610, determining the estimated total resource cost of the measurement sequence based on the plurality of estimated weighted resource costs. For example, the estimated total resource cost may be a product of the estimated weighted resource costs of the measurements. In some embodiments, step 606 may include determining a respective estimated total resource cost for each measurement sequence that implements the logic gate and is shorter than a predetermined length.

In embodiments in which the quantum state includes a Majorana tetron, Majorana hexon, or Majorana octon, the MZMs included in the Majorana tetron, Majorana hexon, or Majorana octon may have a labeling order that indicates a plurality of MZMs included in a computational qubit and a plurality of MZMs included in an ancillary qubit. In such embodiments, step 606 may further include, at step 612, modifying a topological encoding of a computational qubit and an ancillary qubit. These topological encodings may be modified by relabeling the MZMs included in the Majorana tetron, Majorana hexon, or Majorana octon to change how the computational and ancillary qubits are encoded in the physical MZMs.

At step 614, the method 600 may further include determining a first measurement sequence that has a lowest estimated total resource cost of the plurality of measurement sequences. At step 616, the method 600 may further include implementing the logic gate at the topological quantum computing device by applying the first measurement sequence to the quantum state. In some embodiments, step 616 may include the steps of the example method 408 for performing a forced measurement shown in FIG. 16B. In embodiments in which step 604 is performed, step 616 may further include, at step 618, tracking a Pauli gate correction to the logic gate as the measurement sequence is performed.

Although the above examples are provided for topological quantum computing devices 20 including Majorana hexons 30, the systems and methods discussed above may be used when performing topological quantum computation with other non-Abelian anyons or defects. In such embodiments, measurements of fusion channels other than fermionic parities may be performed. The forced measurement and Majorana-Pauli tracking protocols may be used when the measurement outcomes correspond to fusion channels that are Abelian. In addition to MZMs, examples of structures that may be used in the topological quantum computing device include Ising anyons and Parafendleyons (parafermionic zero modes). Although the topological charge discussed in the examples provided above is a joint fermionic parity, the topological charge may be some other quantity when defects other than MZMs are included in the topological quantum computing device. Forced measurement protocols may also be used when the measurement outcomes correspond to non-Abelian fusion channels. In addition, the resource cost estimation systems and methods described above may be applied to other measurement-based operations, such as the injection of non-Clifford gates.

In some embodiments, the methods and processes described herein may be tied to a computing system of one or more computing devices. In particular, such methods and processes may be implemented as a computer-application program or service, an application-programming interface (API), a library, and/or other computer-program product.

Figure 29:
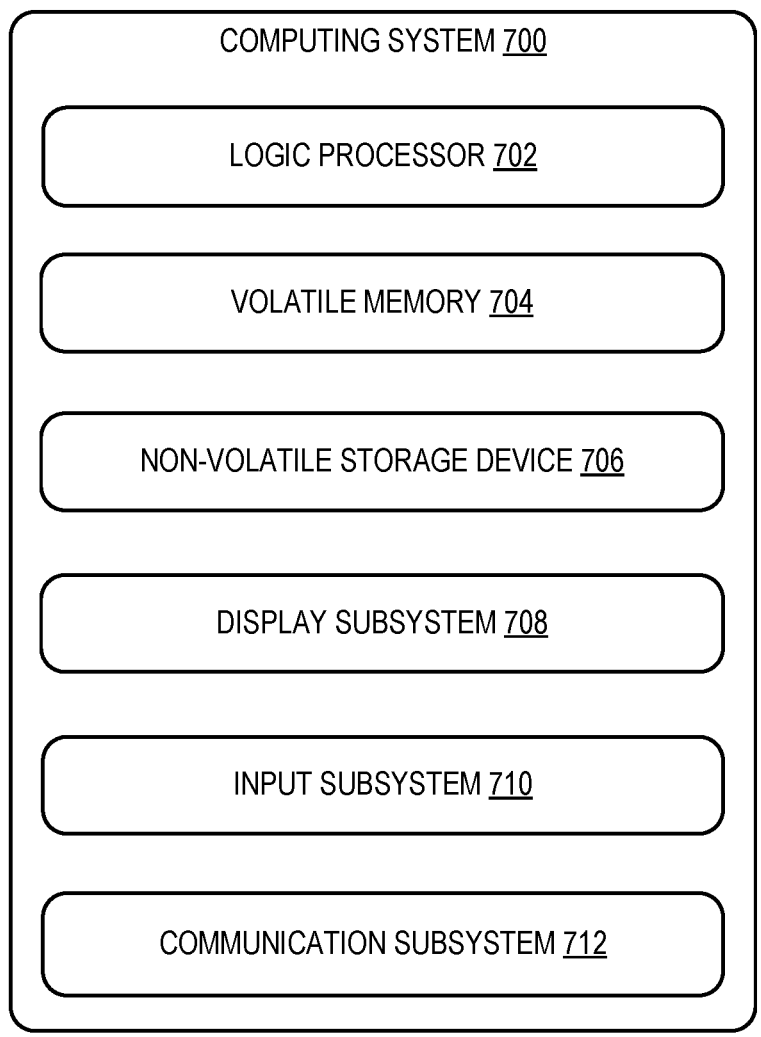
FIG. 29 shows a schematic view of an example computing environment in which the quantum computing system of FIG. 1 may be enacted.

FIG. 29 schematically shows a non-limiting embodiment of a computing system 700 that can enact one or more of the methods and processes described above. Computing system 700 is shown in simplified form. Computing system 700 may embody the quantum computing system 10 described above and illustrated in FIG. 1. Computing system 700 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 700 includes a logic processor 702 volatile memory 704, and a non-volatile storage device 706. Computing system 700 may optionally include a display subsystem 708, input subsystem 710, communication subsystem 712, and/or other components not shown in FIG. 29.

Logic processor 702 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 702 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 706 includes one or more physical devices configured to hold instructions executable by the logic processors to implement the methods and processes described herein. When such methods and processes are implemented, the state of non-volatile storage device 706 may be transformed—e.g., to hold different data.

Non-volatile storage device 706 may include physical devices that are removable and/or built-in. Non-volatile storage device 706 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 706 may include nonvolatile, dynamic, static, read/write, read-only, sequential-access, location-addressable, file-addressable, and/or content-addressable devices. It will be appreciated that non-volatile storage device 706 is configured to hold instructions even when power is cut to the non-volatile storage device 706.

Volatile memory 704 may include physical devices that include random access memory. Volatile memory 704 is typically utilized by logic processor 702 to temporarily store information during processing of software instructions. It will be appreciated that volatile memory 704 typically does not continue to store instructions when power is cut to the volatile memory 704.

Aspects of logic processor 702, volatile memory 704, and non-volatile storage device 706 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 typically implemented in software by a processor to perform a particular function using portions of volatile memory, which function involves transformative processing that specially configures the processor to perform the function. Thus, a module, program, or engine may be instantiated via logic processor 702 executing instructions held by non-volatile storage device 706, using portions of volatile memory 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 708 may be used to present a visual representation of data held by non-volatile storage device 706. The visual representation may take the form of a graphical user interface (GUI). As the herein described methods and processes change the data held by the non-volatile storage device, and thus transform the state of the non-volatile storage device, the state of display subsystem 708 may likewise be transformed to visually represent changes in the underlying data. Display subsystem 708 may include one or more display devices utilizing virtually any type of technology. Such display devices may be combined with logic processor 702, volatile memory 704, and/or non-volatile storage device 706 in a shared enclosure, or such display devices may be peripheral display devices.

When included, input subsystem 710 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 712 may be configured to communicatively couple various computing devices described herein with each other, and with other devices. Communication subsystem 712 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 700 to send and/or receive messages to and/or from other devices via a network such as the Internet.

According to one aspect of the present disclosure, a computing system is provided, including a processor configured to identify a plurality of measurement sequences that implement a logic gate. Each measurement sequence may include a plurality of measurements of a quantum state of a topological quantum computing device. The processor may be further configured to determine a respective estimated total resource cost of each measurement sequence of the plurality of measurement sequences. The processor may be further configured to determine a first measurement sequence that has a lowest estimated total resource cost of the plurality of measurement sequences. The topological quantum computing device may be configured to implement the logic gate by applying the first measurement sequence to the quantum state.

According to this aspect, for each measurement sequence of the plurality of measurement sequences, the processor may be configured to determine the respective estimated total resource cost at least in part by determining an estimated weighted resource cost of each measurement included in the measurement sequence. The processor may be further configured to determine the estimated total resource cost of the measurement sequence based on the plurality of estimated weighted resource costs.

According to this aspect, the estimated weighted resource cost of each measurement may indicate an error rate of the measurement.

According to this aspect, the processor may be configured to determine a respective estimated total resource cost for each measurement sequence that implements the logic gate and is shorter than a predetermined length.

According to this aspect, the processor may be configured to determine the first measurement sequence at least in part by modifying a topological encoding of a computational qubit and an ancillary qubit.

According to this aspect, the topological quantum computing device may include a plurality of Majorana zero modes (MZMs).

According to this aspect, the topological quantum computing device may include at least one of a Majorana tetron including four MZMs, a Majorana hexon including six MZMs, or a Majorana octon including eight MZMs.

According to this aspect, the topological quantum computing device may instantiate the plurality of MZMs in a one-sided architecture or a two-sided architecture.

According to this aspect, the processor may be configured to identify the plurality of measurement sequences that implement the logic gate at least in part by identifying one or more measurement sequences that implement the logic gate multiplied by an overall Pauli operator.

According to this aspect, the processor may be further configured to track a Pauli gate correction to the logic gate when the topological quantum computing device implements the logic gate.

According to this aspect, the topological quantum computing device may be configured to implement the logic gate at least in part by performing a forced measurement of a projection operator. The forced measurement may include performing a first measurement of a topological charge of the quantum state. The forced measurement may further include determining whether a result of the first measurement is a predetermined target value. When the result of the first measurement is not the predetermined target value, the forced measurement may further include resetting the quantum state and repeating the first measurement of the topological charge.

According to this aspect, resetting the quantum state may include repeating a second measurement that was performed prior to the first measurement in the measurement sequence.

According to this aspect, resetting the quantum state includes measuring a plurality of topological charges including a symmetric difference of a first plurality of topological charges on which the first measurement was performed and a second plurality of topological charges on which a second measurement was performed prior to the first measurement in the measurement sequence.

According to another aspect of the present disclosure, a method for performing a quantum computation is provided. The method may include identifying a plurality of measurement sequences that implement a logic gate. Each measurement sequence may include a plurality of measurements of a quantum state of a topological quantum computing device. The method may further include determining a respective estimated total resource cost of each measurement sequence of the plurality of measurement sequences. The method may further include determining a first measurement sequence that has a lowest estimated total resource cost of the plurality of measurement sequences. The method may further include implementing the logic gate at the topological quantum computing device by applying the first measurement sequence to the quantum state.

According to this aspect, for each measurement sequence of the plurality of measurement sequences, determining the respective estimated total resource cost may include determining an estimated weighted resource cost of each measurement included in the measurement sequence. The estimated total resource cost of the measurement sequence may be determined based on the plurality of estimated weighted resource costs. The estimated weighted resource cost of each measurement may indicate an error rate of the measurement.

According to this aspect, the topological quantum computing device may include a plurality of Majorana zero modes (MZMs).

According to this aspect, the topological quantum computing device may instantiate the plurality of MZMs in a one-sided architecture or a two-sided architecture. The topological quantum computing device may include at least one of a Majorana tetron including MZMs, a Majorana hexon including six MZMs, or a Majorana octon including eight MZMs.

According to this aspect, identifying the plurality of measurement sequences that implement the logic gate may include identifying one or more measurement sequences that implement the logic gate multiplied by an overall Pauli operator.

According to this aspect, implementing the logic gate may include performing a forced measurement of a projection operator included in the logic gate. The forced measurement may include performing a first measurement of a topological charge of the quantum state. The forced measurement may further include determining whether a result of the first measurement is a predetermined target value. When the result of the first measurement is not the predetermined target value, the forced measurement may further include resetting the quantum state and repeating the first measurement of the topological charge.

According to another aspect of the present disclosure, a computing system is provided, including a processor configured to identify a plurality of measurement sequences that implement a logic gate. Each measurement sequence may include a plurality of measurements of a quantum state of a topological quantum computing device. The topological quantum computing device may include a Majorana hexon including six Majorana zero modes (MZMs). The processor may be further configured to determine an estimated weighted resource cost of each measurement included in each measurement sequence of the plurality of measurement sequences. For each measurement sequence, the processor may be further configured to determine the estimated total resource cost of the measurement sequence based on the estimated weighted resource costs of the measurements included in the measurement sequence. The processor may be further configured to determine a first measurement sequence that has a lowest estimated total resource cost of the plurality of measurement sequences. The topological quantum computing device may be configured to implement the logic gate by applying the first measurement sequence to the quantum state.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system comprising:
a processor configured to:
identify a plurality of measurement sequences that implement a logic gate, each measurement sequence including a plurality of measurements of a quantum state of a topological quantum computing device;
for each measurement sequence of the plurality of measurement sequences that implements the logic gate and is shorter than a predetermined number of measurements, determine a respective estimated total error rate of implementing the logic gate at the quantum state using that measurement sequence; and
determine a first measurement sequence that has a lowest estimated total error rate of the plurality of measurement sequences,
wherein the topological quantum computing device is configured to implement the logic gate by applying the first measurement sequence to the quantum state.

2. The computing system of claim 1, wherein, for each measurement sequence of the plurality of measurement sequences, the processor is configured to determine the respective estimated total error rate at least in part by:
determining an estimated weighted error rate of each measurement included in the measurement sequence; and
determining the estimated total error rate of the measurement sequence based on the plurality of estimated weighted error rates.

3. The computing system of claim 1, wherein the processor is configured to determine the first measurement sequence at least in part by modifying a topological encoding of a computational qubit and an ancillary qubit.

4. The computing system of claim 1, wherein the topological quantum computing device includes a plurality of Majorana zero modes (MZMs).

5. The computing system of claim 4, wherein the topological quantum computing device includes at least one of a Majorana tetron including four MZMs, a Majorana hexon including six MZMs, or a Majorana octon including eight MZMs.

6. The computing system of claim 4, wherein the topological quantum computing device instantiates the plurality of MZMs in a one-sided architecture or a two-sided architecture.

7. The computing system of claim 4, wherein the processor is configured to identify the plurality of measurement sequences that implement the logic gate at least in part by identifying one or more measurement sequences that implement the logic gate multiplied by an overall Pauli operator.

8. The computing system of claim 7, wherein the processor is further configured to track a Pauli gate correction to the logic gate when the topological quantum computing device implements the logic gate.

9. The computing system of claim 1, wherein the topological quantum computing device is configured to implement the logic gate at least in part by performing a forced measurement of a projection operator, wherein the forced measurement includes:
performing a first measurement of a topological charge of the quantum state;
determining whether a result of the first measurement is a predetermined target value;
when the result of the first measurement is not the predetermined target value:
resetting the quantum state; and
repeating the first measurement of the topological charge.

10. The computing system of claim 9, wherein resetting the quantum state includes repeating a second measurement that was performed prior to the first measurement in the measurement sequence.

11. The computing system of claim 9, wherein resetting the quantum state includes measuring a plurality of topological charges including a symmetric difference of:
a first plurality of topological charges on which the first measurement was performed; and
a second plurality of topological charges on which a second measurement was performed prior to the first measurement in the measurement sequence.

12. A method for performing a quantum computation, the method comprising:
identifying a plurality of measurement sequences that implement a logic gate, each measurement sequence including a plurality of measurements of a quantum state of a topological quantum computing device;
for each measurement sequence of the plurality of measurement sequences that implements the logic gate and is shorter than a predetermined number of measurements, determining a respective estimated total error rate of implementing the logic gate at the quantum state using that measurement sequence;
determining a first measurement sequence that has a lowest estimated total error rate of the plurality of measurement sequences; and
implementing the logic gate at the topological quantum computing device by applying the first measurement sequence to the quantum state.

13. The method of claim 12, wherein, for each measurement sequence of the plurality of measurement sequences, determining the respective estimated total error rate includes:
determining an estimated weighted error rate of each measurement included in the measurement sequence; and
determining the estimated total error rate of the measurement sequence based on the plurality of estimated weighted error rates.

14. The method of claim 12, wherein the topological quantum computing device includes a plurality of Majorana zero modes (MZMs).

15. The method of claim 14, wherein:
the topological quantum computing device instantiates the plurality of MZMs in a one-sided architecture or a two-sided architecture; and
the topological quantum computing device includes at least one of a Majorana tetron including MZMs, a Majorana hexon including six MZMs, or a Majorana octon including eight MZMs.

16. The method of claim 14, wherein identifying the plurality of measurement sequences that implement the logic gate includes identifying one or more measurement sequences that implement the logic gate multiplied by an overall Pauli operator.

17. The method of claim 12, wherein implementing the logic gate includes performing a forced measurement of a projection operator included in the logic gate, wherein the forced measurement includes:
performing a first measurement of a topological charge of the quantum state;
determining whether a result of the first measurement is a predetermined target value;
when the result of the first measurement is not the predetermined target value:
resetting the quantum state; and
repeating the first measurement of the topological charge.

18. A computing system comprising:
a processor configured to:
identify a plurality of measurement sequences that implement a logic gate, each measurement sequence including a plurality of measurements of a quantum state of a topological quantum computing device, wherein the topological quantum computing device includes a Majorana hexon including six Majorana zero modes (MZMs);
determine an estimated weighted error rate of each measurement included in each measurement sequence of the plurality of measurement sequences that implements the logic gate and is shorter than a predetermined number of measurements; and
for each measurement sequence of the plurality of measurement sequences, determine a respective estimated total error rate of the measurement sequence based on the estimated weighted error rates of the measurements included in the measurement sequence; and
determine a first measurement sequence that has a lowest estimated total error rate of the plurality of measurement sequences,
wherein the topological quantum computing device is configured to implement the logic gate by applying the first measurement sequence to the quantum state.

* * * * *